United States Patent
Stojanović et al.

(10) Patent No.: US 10,452,927 B2
(45) Date of Patent: Oct. 22, 2019

(54) OBJECT LOCALIZATION WITHIN A SEMANTIC DOMAIN

(71) Applicant: Ydrive, Inc., Bellevue, WA (US)

(72) Inventors: Milos Stojanović, Belgrade (RS); Udiyan Padmanabhan, Bellevue, WA (US)

(73) Assignee: Ydrive, Inc., Bellevue, WA (US)

( * ) Notice: Subject to any disclaimer, the term of this patent is extended or adjusted under 35 U.S.C. 154(b) by 0 days.

(21) Appl. No.: 16/058,795

(22) Filed: Aug. 8, 2018

(65) Prior Publication Data
US 2019/0050648 A1     Feb. 14, 2019

Related U.S. Application Data

(60) Provisional application No. 62/583,284, filed on Nov. 8, 2017, provisional application No. 62/543,275, filed on Aug. 9, 2017.

(51) Int. Cl.
| | |
|---|---|
| *H04N 7/18* | (2006.01) |
| *G06T 11/60* | (2006.01) |
| *G06K 9/00* | (2006.01) |

(52) U.S. Cl.
CPC .......... *G06K 9/00791* (2013.01); *G06T 11/60* (2013.01); *H04N 7/185* (2013.01); *H04N 7/18* (2013.01)

(58) Field of Classification Search
CPC combination set(s) only.
See application file for complete search history.

(56) References Cited

U.S. PATENT DOCUMENTS

| | | | |
|---|---|---|---|
| 9,606,539 B1 * | 3/2017 | Kentley | G01S 17/023 |
| 2015/0170526 A1 | 6/2015 | Wang et al. | |
| 2015/0371440 A1 | 12/2015 | Pirchheim et al. | |
| 2017/0123429 A1 * | 5/2017 | Levinson | G05D 1/0088 |

(Continued)

OTHER PUBLICATIONS

Stojanovic, M. (Mar. 15, 2018). SemLoc: Visual Localization Based on Semantic Correspondence. (Master's Thesis). University of Belgrade. Belgrade, Serbia. 50 pages.

(Continued)

*Primary Examiner* — Md N Haque
(74) *Attorney, Agent, or Firm* — Shook, Hardy & Bacon, L.L.P.

(57) ABSTRACT

Localizing a vehicle on the Earth's surface, via the registration of a map and real-time images of the vehicle's environment, is discussed. Both the map and real-time images are 2D representations of the surface, both are from an aerial-view perspective of the surface, and both are represented in a semantic-domain, rather than a visual-domain. The map is an aerial-view semantic map that includes 2D semantic representations of objects located on the surface. The semantic representations of the map indicate semantic labels and absolute positions of the objects. The real-time images are real-time aerial-view semantic images that include additional 2D semantic representations of the objects. The additional semantic representations of the real-time images indicate semantic labels and relative positions of the objects. Via image registration, the absolute position and orientation of the vehicle is determined based on a spatial and rotational correspondence between the absolute and relative positions of the objects.

19 Claims, 18 Drawing Sheets

(56) References Cited

U.S. PATENT DOCUMENTS

2017/0124476 A1    5/2017  Levinson et al.
2017/0124781 A1*   5/2017  Douillard .............. G01S 15/931
2017/0132934 A1*   5/2017  Kentley ................ G08G 1/202
2017/0316333 A1*  11/2017  Levinson ............. G05D 1/0088

OTHER PUBLICATIONS

International Search Report and Written Opinion dated Nov. 26, 2018 in International Patent Application No. PCT/US18/45990, 9 pages.

* cited by examiner

OBJECT LOCALIZATION WITHIN A SEMANTIC DOMAIN

CROSS REFERENCE TO RELATED APPLICATIONS

The application claims priority to U.S. Provisional Patent Application No. 62/543,275, filed on Aug. 9, 2017, entitled VEHICLE LOCALIZATION USING SEMANTIC IMAGERY, the contents of which are hereby incorporated by reference in their entirety. The application also claims priority to U.S. Provisional Patent Application No. 62/583,284, filed on Nov. 8, 2017, entitled CREATING HIGH ACCURACY AERIAL VIEW MAPS FROM SURFACE IMAGERY, the contents of which are hereby incorporated by reference in their entirety.

BACKGROUND

The autonomous vehicle revolution (e.g., the emergence of self-driving cars) has necessitated the need for accurate and precise vehicle localization during the vehicle's drive-time. That is, in order to successfully arrive at a particular destination via a safe, legal, and at least a somewhat optimized route, an autonomous vehicle must avoid non-drivable surfaces, stay within a proper lane of a drivable surface (e.g., a road), and navigate intersections, turns, and curves in the drivable surface. Autonomous vehicles must also continually re-assess and optimize its route based on observed drive-time environmental conditions (e.g., traffic congestion, road closures, weather conditions, and the like). Thus, an autonomous vehicle is required to continually (and in real-time) determine and/or update its position on the surface of the Earth, as well as its orientation. Furthermore, in order to ensure wide adoption of autonomous vehicles by the public, such determinations (i.e., localizations) must be precise and accurate enough to achieve a safer and more efficient driving performance than that of a human driver. That is, in order to be viable, autonomous vehicles must perform at least as well as the average human driver.

Some conventional approaches for localizing autonomous vehicles have relied on various Global Navigation Satellite Systems (GNSSs), such as the Global Positioning System (GPS), Galileo, and GLONASS. However, such satellite-based approaches, which determine a position on the surface of the Earth via triangulating satellite-emitted signals, have performance constraints that limit their applicability to autonomous vehicle localization. For instance, the accuracy and precision of various GNSS methods is on the order of several meters, which may not be great enough for autonomous vehicle applications. Furthermore, the civilian-accessible versions of such systems are even less accurate than their military counterparts. Also, environmental conditions such as thick cloud cover or tree cover attenuates the strength of the satellite-emitted signals, which further decreases their performance. Additional degradations in GNNS-based localization performance may result from transmitter-receiver line-of-sight issues (e.g., urban canyons) and multi-path effects (e.g., signal reflections from buildings and other urban structures). Thus, conventional GNNS-based localization may perform particularly poor in urban areas, as well as in other domains. Furthermore, such triangulation-based methods cannot provide an orientation of a vehicle, unless the vehicle is in motion (and assumed to be not going in reverse).

Other conventional methods have employed cellular towers and other stationary signal-emitters (e.g., Wi-Fi routers and/or repeaters) as sources of signals from which to triangulate and determine a location. However, whether these terrestrial-based signals are used as an alternative to satellite-based signals or whether these signals are used to supplement satellite-based signals, such methods still suffer from poor performance. That is, such methods may not provide the localization accuracy and precision required for safe and efficient navigation of autonomous vehicles.

Still other conventional methods of vehicle localization have attempted to correlate three-dimensional (3D) visual features within maps and drive-time images. In order to determine the vehicle's location and orientation, such visual-domain approaches may employ a 3D visual map of a vehicle's environment, generated prior to drive-time, and drive-time generated 3D visual images of the vehicle's environment. In these conventional methods, a vehicle may have access to the previously-generated visual 3D map of their environment. During drive-time, the vehicle captures 3D visual images of their environment, via a light detection and ranging (LIDAR) camera (or other 3D imaging devices). These approaches correlate features in the visual 3D map and visual features in the 3D visual images, and locate the vehicle within the map via the correlation. That is, corresponding 3D visual features such as edges, surface textures, and geometric shapes are matched between the 3D visual map and the 3D visual drive-time images. Such visual-feature mapping, and knowledge of the optics of the vehicle's cameras, enables a determination of the perspective (and hence the vehicle's location) from which the drive-time images were generated.

However, the performance of such visual-domain feature matching approaches are also limited in the application of autonomous vehicles. The 3D visual maps, as well as the drive-time 3D images, require significant amounts of storage and computational processing. The data encoding such conventional maps and drive-time images may be structured as spatially-discretized locations in 3D space and stored via a 3D array of visual features inferred from pixel values. These methods may store the 3D array of features, via vectorized representations, as well as pixel values. The inclusion of all three spatial-dimensions is informationally expensive. Even though some of the 3D information associated with these conventional methods may be somewhat "sparsified" or compressed, the amount of storage required to encode 3D visual maps and 3D images may still result in significantly intractable storage and computational requirements.

Furthermore, matching features in the 3D visual domain (e.g., image registration that correlates 3D edges, surface textures, and geometric shapes) is computationally expensive. Again, the inclusion of the third dimension significantly increases the computational expense. Furthermore, the visual-domain includes numerous complex features, including, but not limited to, various characterizations of edges, surfaces, and shapes. Matching such numerous and complex visual features in three dimensions is computationally expensive. Because the visual-domain feature correlation must be performed in real-time, the computational overhead (e.g., memory and speed) required for such visual-domain feature matching may be unacceptable for some real-time applications, such as the drive-time localization of an autonomous vehicle.

Also, generation and updating of the 3D visual maps is expensive. Conventional 3D visual maps are often generated via a combination of a significant number of 3D visual images taken from a perspective similar to that of the vehicles that will later employ the map. The 3D maps may include 3D point or feature clouds. To obtain the required 3D visual images (i.e., 3D point clouds), fleets of survey vehicles may be required to survey the environment and capture 3D visual images. Furthermore, to obtain images of adequate resolution required to generate a 3D map, LIDAR cameras, or other laser-based cameras, such as but not limited to time-of-flight (TOF) cameras, are conventionally employed. LIDAR cameras increase both the expense of acquiring the images, as well as the amount of information encoded in the image data. Also, the performance of LIDAR and TOF cameras may suffer due to inclement weather conditions, such as rain, snow, fog, smoke, smog, and the like. For example, a scanning laser may be attenuated and/or multiple reflected or refracted via particulates in the atmosphere, and the imagined textures of surfaces may be degraded via the presences of moisture on the surface. Due to changing environmental conditions, these 3D maps require a continual process of updating and propagating the updates to each copy of a 3D map. For example, the shape and/or geometries of the environment may change due to construction activities, or the like. Such environment changes may also change textures of the surfaces, which will effect the performance of LIDAR camera-based approaches. Such updating and syncing requirements are significantly complex to implement.

SUMMARY

The various embodiments herein are directed towards localizing an object (e.g., a vehicle) on a surface (e.g., the Earth's surface) via the registration of a map and real-time images of the object's current environment. Both the map and real-time images that are registered may be two-dimensional (2D) representations of the object's environment (i.e., the surface of the Earth), both are from an aerial-view (i.e., a bird's-eye view) perspective of the surface, and both are represented in a semantic-domain, rather than a visual-domain. That is, the map may be a 2D aerial-view semantic map and the registered real-time images may be 2D real-time aerial-view semantic images. The aerial-view semantic map may include semantic representations of objects within the vehicles' environment. The semantic representations of the semantic map may indicate semantic labels and absolute positions of the static (i.e., non-dynamic) objects within the environment. The semantic map may be generated by semantically segmenting aerial-view visual images, terrestrial-view visual images, or a combination thereof. A semantic map (and/or a semantic image) may include at least some visual features. Accordingly, in at least some embodiments, a semantic map may be a semantic-visual map, and a semantic image may be a semantic-visual image. In various embodiments, a 2D map may include at least some indications of the third dimension (e.g., indications of the elevations of at least some of the objects within the environment.) Such indications may be provided via contours or numerical expressions indicating the elevations. In some embodiments, such third dimensional indications may be encoded in the metadata of the 2D map. Such 2D maps that indicate at least some third-dimensional indications may be referred to as "2.5D maps."

In real-time, an imaging system included in a vehicle may capture 2D, stereographic, and/or 3D visual images of the vehicle's environment. That is, the vehicle may capture real-time terrestrial-view visual images that include real-time visual representations of the objects within the environment. The real-time terrestrial-view visual images may be semantically segmented and the perspective of these segmented images may be transformed from the terrestrial-view to the aerial-view via inverse perspective mapping to generate 2D real-time aerial-view semantic images. The real-time aerial-view semantic images include real-time semantic representations of the objects in the environment. The semantic representations of the real-time semantic images indicate semantic labeling and relative positions, with respect to the vehicle, of the objects within the environment. The aerial-view semantic map and the aerial-view semantic images are registered. Based on the image registration, as well as the absolute and relative positions of the objects, the absolute position and orientation of the vehicle is determined. That is, the vehicle is localized in the semantic domain by determining a one or more global coordinates and a global bearing for the vehicle.

DETAILED DESCRIPTION

Figure 1:
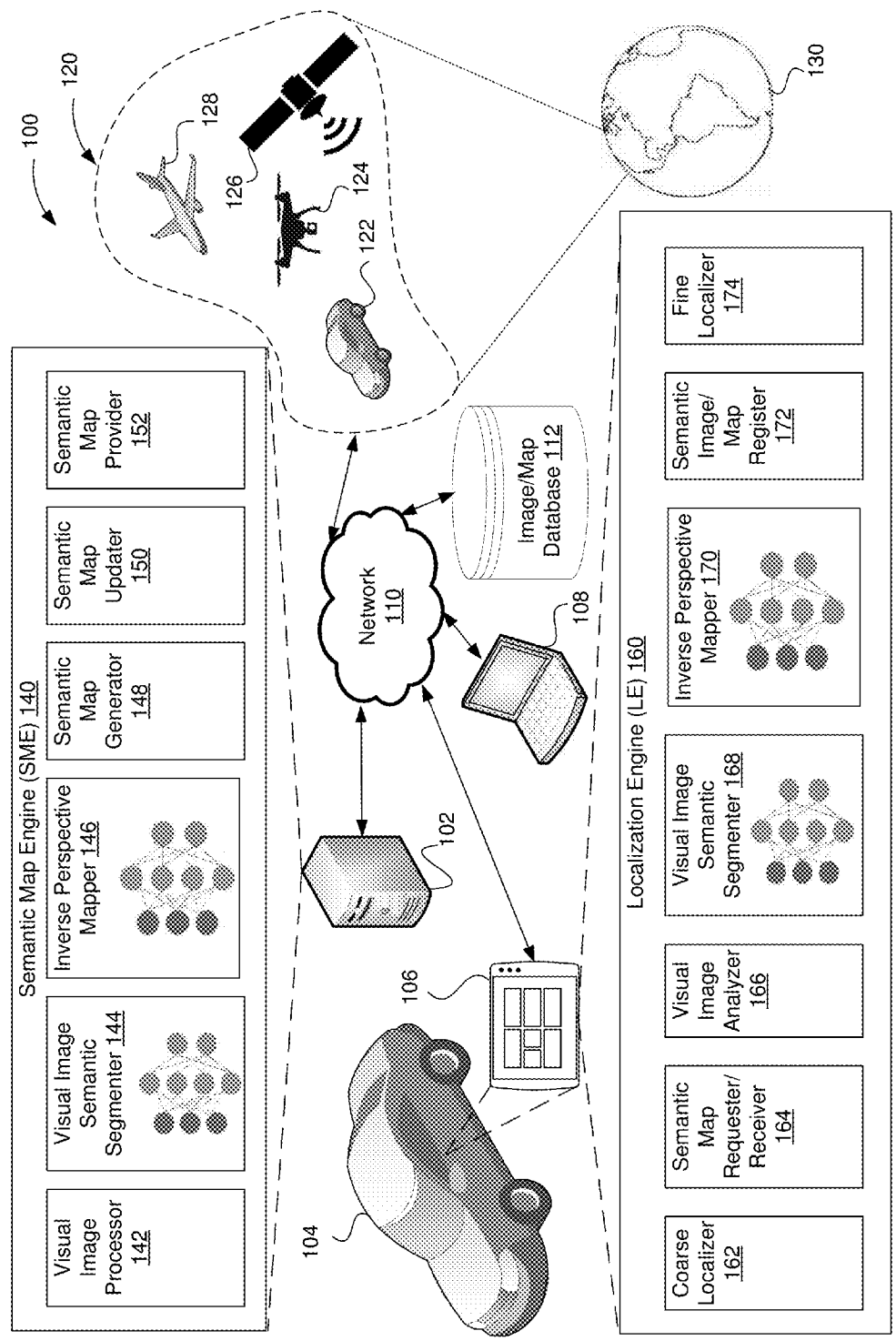
FIG. 1 illustrates an enhanced object localization system implementing various embodiments presented herein.

The various embodiments herein are directed towards localizing an object (e.g., a vehicle) on a surface (e.g., the Earth's surface) via the registration of a map and real-time images of the object's current environment. Both the map and real-time images that are registered may be two-dimensional (2D) representations of the object's environment (i.e., the surface), both are from an aerial-view (i.e., a bird's-eye view) perspective of the surface, and both are represented in a semantic-domain, rather than a visual-domain. As discussed throughout, the employment of both a 2D aerial-view semantic map and a 2D real-time aerial-view semantic image provides various improvements and advantageous over conventional localization methods. Thus, in numerous respects, the embodiments herein provide significant enhancements over, and are contrasted with, various conventional localization methods.

For example, conventional methods often perform image registrations of a three-dimensional (3D) map and 3D real-time images. In contrast to such conventional methods, the embodiments herein register a 2D map and 2D real-time images. Furthermore, many conventional methods perform image registrations of a street-level view (or terrestrial-view) map and street-level view real-time images. In contrast to these conventional methods, the embodiments herein register an aerial-view map of the surface with a real-time aerial-view image of the surface.

As another example of differentiation with conventional localization methods, the image registration of conventional methods is often in the visual-domain. That is, conventional localization may employ a visual map and real-time visual images that encode numerous visual features (or visual representations), such as edges, surface textures, and geometric shapes within the object's environment. As such, conventional visual-domain image registration methods correlate such visual features and/or visual representations (e.g., edges, textures, and shapes) that are similar across images. In contrast to correlating visual features and/or visual representations, the enhanced semantic-domain registration embodiments herein correlate semantic features (e.g., semantic representations) encoded and/or represented in the semantic map and the real-time semantic images. The semantic features included in semantic images and semantic maps may correspond to the tangible objects in the environment. Visual images encoding visual features and/or visual representations are contrasted with semantic images (and semantic maps) that encode semantically-labeled (i.e., semantic representations of) tangible objects with the environment of the object to be localized. The various improvements and advantages of these distinctions are described throughout. As a non-limiting example of such an improvement and/or advantage, over convention visual images and/or visual maps, is that the semantic images/maps are dense. For instance, all, or at least most of, the semantic pixels have some semantic labels and all (or at least most) of them are used in the localization. The encoded visual features of conventional approaches use sparse representations (i.e. they use some small subset of "relevant" pixels, such as a small subset of pixels that encode edges, corners, and other visual features.). An advantage of the embodiments herein is the enablement of a dense approach for localization that employs all (or most) of the semantically-labelled pixels of semantic maps/images. The employment of this dense information provides significant advantages, over conventional methods, for the performance of the inverse perspective mappings discussed herein.

As used herein, terms such as "localizing," "localize," and "localization" generally refer to determining an object's position (or locations) and orientation on a two-dimensional (2D) surface that is embedded within 3D space, such as but not limited to the surface (or portions thereof) of the Earth. Localizing an object may include determining an absolute position (or locations) of the object, wherein the absolute position (or location) is with respect to the surface. The embodiments herein register, in the semantic-domain, a previously generated semantic map of the surface and real-time semantic images of the object's current environment. That is, based on correlating semantic features encoded in the semantic map and corresponding semantic features encoded in the real-time semantic image, a registration of the semantic map and the semantic images is generated. The registration and a coordinate system associated with the map enable a precise and accurate determination of both the object's position and orientation on the surface. In contrast to conventional methods that localize an object via the correlation of visual features encoded within 3D visual images, the 2D maps and 2D images employed for image registrations herein are in the semantic-domain (i.e., the maps and images herein encode semantic features, rather than visual features). As discussed throughout, the enhanced semantic-domain systems and methods herein provide significant performance improvements over such visual-domain feature-matching localization methods, e.g., improvements in the reliability, accuracy, and precision of the determined position/orientation, as well a decrease in the required computational overhead and storage space. The embodiments herein also provide significant performance improvements (e.g., reliability, accuracy, and precision) over conventional triangularization-based methods, whether the triangulated signals are emitted by satellites or terrestrial sources (e.g., cellular towers or W-Fi routers/repeaters).

In particular, prior to localizing an object (e.g., a vehicle) on a surface, the various embodiments generate an aerial-view (or bird's-eye view) semantic map of the surface, such as but not limited to at least a portion of the Earth's drivable surfaces. In contrast to conventional maps, the semantic map provides a correspondence between regions of the map (and thus positions on the surface via the associated coordinate system) to various semantic labels (or concepts), such as but not limited to roads, buildings, cars, trees, sidewalks, lane dividers, or other such tangible objects. The semantic label of a region of the semantic map indicates a corresponding tangible object located at the map region's corresponding position on the surface. As discussed below, the semantic map may be encoded via a pixel format. In such embodiments, each pixel of a semantic map may correspond to one or more semantic labels. That is, the pixel values of a semantic map may encode a semantic label.

Additionally, each pixel encoding the semantic map may correspond to a particular location on the surface via the coordinate system. Thus, the pixel values of a semantic map may encode a semantic label corresponding to a tangible object located (or positioned) on (or above) the surface. A particular pixel is associated with coordinates (of the coordinate system) that correspond to the pixel's corresponding particular location (or position) on the surface. In some embodiments, in addition to a semantic label, the pixel values of a particular pixel of the semantic map may encode the corresponding (or associated) coordinates of the coordinate system that indicate the pixel's corresponding position on the surface.

As discussed herein, a semantic map may include a semantic representation for one or more of the tangible objects (e.g., roads, sidewalks, trees, buildings, and the like) within a vehicle's environment. A semantic representation of such a tangible object may include and/or indicate a semantic label that indicates a semantic concept (e.g., "road," "sidewalk," "tree," "building," and the like) associated with the tangible object. The semantic label may be indicated via a color value and/or grayscale value for the pixels that are associated with the semantic representation of the tangible object. In other embodiments, the semantic label may be indicated and/or encoded by one or more numerical semantic class IDs and/or vectorized representations of the areas belonging to particular semantic class (for example storing an array of geometrical polygons representing the location of the pixels belonging to semantical class). The semantic representation of a tangible object may also include and/or indicate an absolute position (or location) of the tangible object, with respect to the surface. The absolute position of the tangible object may be indicated via the coordinates (of the associated coordinate system) associated with the pixels that are associated with the semantic representation of the object. Note that because any tangible object is spatially extended in three dimensions (i.e., no tangible object is a mathematical point, line, or plane), the absolute position of a tangible object, with respect to the surface, may be a region or area on the map. That is, the semantic representation of an object is encoded in multiple pixels that define an area or region of the map. The absolute position of the object may include all the coordinates that are associated with the semantic representation of the object. The absolute location of the physical boundaries of the tangible object may be determined via the coordinates associated with the boundary of semantic representation of the tangible object on the semantic map.

The semantic map may be generated via semantic segmentation of aerial-view visual images of the surface, semantic segmentation of terrestrial-perspective (i.e., street-level) visual images (and inverse perspective mapping to the aerial-view), and/or a combination thereof. The semantic segmenting generates the correspondence between regions on the map (i.e., the pixels) and the various semantic concepts or labels indicating the tangible objects on the surface. More generally, the semantic segmentation of a visual image generates a corresponding semantic image (i.e., a semantic representation) by associating a semantic label (or class) to each pixel in the visual image. The pixels of the corresponding semantic image encode the associated semantic label, rather than the visual information (e.g., RGB values) encoded in the corresponding visual image. In some embodiments, the semantic segmentation of a visual image is performed via a deep learned neural network, such as, but not limited to, a deep convolutional neural network (CNN). In other embodiments, deep learning methods other than CNNs may be employed to semantically segment a visual image. For example, various end-to-end learning methods may be employed to learn to semantically segment a visual image. In at least some embodiments, the semantic labelling inherent in a semantic map and/or a semantic image may enable even further compression. For example, the depth of the pixel values of a semantic map/image may be significantly less than 8 bits (i.e., less than 256 colors).

During drive-time (or equivalently real-time), one or more imagers (such as but not limited to a camera) included in an object (e.g., a vehicle) generate image data encoding terrestrial-perspective visual images that indicate the vehicle's street-level visual view. Such street-level visual images include street-level visual representations of the tangible objects in the vehicle's environment. In real-time, these terrestrial-view visual images are semantically segmented to generate drive-time terrestrial-perspective (i.e., terrestrial-view) semantic images. Similar to the semantic map, the terrestrial-view semantic images provide a correspondence between regions of the drive-time images to the various semantic labels (or concepts) that correspond to tangible objects within the vehicle's environment.

That is, as discussed above, the drive-time terrestrial-view semantic images include semantic representations of the tangible objects in the vehicle's environment. In addition to including and/or indicating a semantic label for the object, the semantic representation of the object included in a drive-time semantic image may include and/or indicate a relative position (or location) of the object, with respect to the vehicle. The image data may be encoded in a pixel format. Thus, the pixel values of the semantic images encode semantic labels (or concepts) that correspond to the environment's tangible objects. As indicated above, semantic images are contrasted with conventional visual images, in that the visual image data (i.e., pixel values) of conventional visual images encode visual information (e.g., RGB values or other such information). The semantic image data of semantic images encode semantic labels or concepts. As also indicated above, drive-time terrestrial-view visual images, captured by the vehicle, are employed as input to generate the drive-time terrestrial-view semantic images via semantic segmentation. Similar to the generation of the semantic map, the semantic segmentations of the drive-time images may be performed via a deep CNN.

A real-time aerial-view semantic image is generated by transforming the perspective of a drive-time terrestrial-view semantic image, via a geometric transformation of the pixels of the terrestrial-view semantic image. Thus, an aerial view (or bird's-eye view) of the vehicle's semantically segmented environment is generated from the street-level images captured from the vehicle. That is, the semantic image data of the terrestrial-level semantic images are transformed, via semantic inverse perspective mapping techniques, such that the perspective of the transformed images is from an aerial-view similar to that of the semantic map. More particularly, semantic-domain image perspective mapping is employed to generate drive-time aerial-view semantic images based on the drive-time terrestrial-view semantic images of the vehicle's environment, such that the aerial-view semantic map and the drive-time aerial-view semantic images are from a similar perspective, i.e., a bird's-eye view of the surface. Geometric transformations of the ordering of the pixels in the terrestrial-view images are performed to generate the shift in perspective. In some embodiments, another neural network is employed to generate the transformation from the street-level perspective to the aerial or bird's-eye perspective. In at least one alternative embodiment, an image perspective mapping is performed on the terrestrial-via visual image to generate an aerial-view visual image. The aerial-view visual image is semantically segmented to generate the aerial-view semantic image. In various embodiments, drive-time aerial-view semantic image includes semantic representations of the tangible objects in the vehicle's environment. Because the drive-time visual images were captured with imaging systems embedded in the vehicle, the semantic representations of the objected included in the drive-time aerial-view semantic image included and/or indicate an relative position (or location) or the objects, with respect to the vehicle, as well as semantic labels for the objects. The inverse perspective mapping methods employed herein may be agnostic to information represented by pixels (that is, inverse perspective mapping may not treat semantic and visual images differently). Furthermore, the inverse perspective mapping methods employed herein are not limited to conventional geometric perspective mapping. Rather, other approaches may be implemented in order to transform perspective image to an aerial-view. For example, a 3D point cloud may be generated from the terrestrial-view image (e.g. applying CNNs). The points of the 3D point cloud may be projected onto the reference surface. To increase the performance, stereo images (captured by calibrated pair of cameras) may be captured and employed as the terrestrial-view image. In at least one embodiment, a LIDAR camera may augments other cameras in order to capture a plurality of images to generate the 3D point cloud.

An enhanced image registration of the aerial-view semantic map and the drive-time aerial-view semantic images is performed via the semantic-label encoding pixels of the map and the semantic-label encoding pixels of the drive-time images. In contrast to conventional image registration methods, which are performed in the visual-domain, the enhanced image registration methods herein are performed in the semantic-domain. In various embodiments, the registration includes generating and/or determining a spatial correspondence and/or alignment between the semantic representations in the aerial-view semantic map and the semantic representations of the drive-time aerial-view semantic. Based on the semantic-domain registration and the coordinate system associated with the map, the position and orientation of the vehicle is reliably determined to a high degree of precision and accuracy. In at least one embodiment, a spatial correspondence between the absolute positions of the tangible objects (as indicated via the semantic representations in the semantic map) and the relative positions (as indicated via the semantic representations in the drive-time semantic images) is generated. The absolute position of the vehicle, with respect to the surface, is determined via the spatial correspondence between absolute positions of the objects and the relative positions of the objects. That is, the vehicle (or other object) is precisely and accurately localized via an image registration of a semantic map and drive-time semantic images. The registration may also include generating a rotational correspondence between the sematic representations of the objects in the semantic map and drive-time semantic images. The rotational orientation of the vehicle, with respect to the surface, may be determined via the rotational correspondence between the semantic representations of the map and the drive-time images.

The position (or location) of an object localized via the semantic-domain, as discussed herein, may be indicated and/or encoded by coordinates of the coordinate system associated with the semantic map. As discussed above, the coordinate system provides a one-to-one mapping or correspondence between coordinates (or the coordinate system) and locations on a surface (e.g., the Earth's surface). Each unique set of coordinates of the coordinate system uniquely indicates a unique location of the surface. The coordinate system may be a global geographic coordinate system that enables each point on the surface to be uniquely characterized via at least two real scalars. Such coordinate systems may be generated via map projections and include, but are not limited to the Universal Transverse Mercator (UTM) coordinate, Universal Polar Stereographic (UPS) coordinate system, and the like. The coordinates of the coordinate system may indicate longitudes and latitudes of a location on the surface. Thus, the coordinates may be indicated and/or encoded via two real scalars (or alternatively a 2D real vector). In some embodiments, the coordinates may additionally indicate an elevation, and thus be encoded via three real scalars (or a 3D real vector). The orientation of the localized object may be indicated by another real scalar (e.g., a navigational bearing). Thus, the localization of an object may be characterized and/or indicated by coordinates of a global coordinate system and a bearing (i.e., three or four real scalar values that may be encoded via a 3D or 4D vector value). It should be noted that the employment of other coordinate systems (e.g., Cartesian coordinates) and other representations of the position/orientation of a localized object are possible. Many of the embodiments herein are discussed within the context of, localizing a vehicle, such as but not limited to an autonomous (or at least semi-autonomous) vehicle, during drive-time. However, other embodiments are not so constrained. It is recognized that the various semantic-domain embodiments discussed herein may be applied to localize objects other than vehicles. It should be noted that when localizing a vehicle, the term "drive-time," may be used interchangeably with the term "real-time."

As used herein, the term "image" may refer to any 2D or 3D structured data (i.e., a data structure). The image data encoded in an image is structured as an array of pixels, each pixel storing pixel values. The array of pixels may be a 1D, 2D, or 3D array, depending upon the structure and dimensionality of the image. As used herein, the term "map," may refer to an image that is associated with a spatial coordinate system. That is, each pixel of a map is associated with one or more coordinates of the coordinate system, wherein the associated coordinates uniquely indicate a spatial location or position. In some embodiments, the pixel values for a particular pixel of a map may encode the coordinates associated with or corresponding to the particular map pixel.

The term "visual image," may refer to a 2D or 3D image, where the pixel values encode visual features (i.e., visual representations of tangible objects). Such encoded visual features within visual images include but are not limited to edges, surface textures, geometric shapes, colors, hues, lighting effects, and the likes. The visual features and/or visual representations may correspond to the tangible objects in the environment. The visual image data encoding visual images may be generated via various imagers or sensors that detect electromagnetic (EM) waves or photons of various frequencies (or wavelengths). Imaging devices that may generate visual images include, but are not limited to cameras that detect visual wavelengths, infrared (IR) cameras, ultraviolet (UV) cameras, radio-frequency (RF) detectors, microwave detectors, and the like. Such imaging devices may include light detection and ranging (LIDAR) cameras, time-of-flight (TOF) cameras, or other laser-scanning-based cameras. Other imaging devices that generate visual images may include stereoscopic cameras, 3D cameras, and the like. Any devices that may generate visual image data encoding a visual image may be collected referred to as "visual image imagers," "visual image cameras," "visual image detectors," and/or "visual image sensors." In various embodiments, the pixel values of a visual image encode information about the detected wave's/photon's intensity, amplitude, frequency, wavelength, polarization, and/or phase. That is, the pixel values of visual images encode various detected aspects waves/photons received from (i.e., reflected from or emitted by) tangible objects in the environment. The pixel values of visual images may be encoded in a red-green-blue (RGB) format, a greyscale format, or any other such format. The term "visual map" may refer to a visual image that is a map. That is, a visual map is a visual image that is associated with a coordinate system. The term "visual-domain" may refer to encoding or representing visual features. Thus, visual images and visual maps may be referred to as being represented in a visual-domain.

In contrast to a visual image, the term "semantic image," may refer to a 2D or 3D image, where the pixel values encode a semantic concept, class, label, feature, and/or category. Such semantic labels may indicate any semantic concept, including but not limited to a tangible object that is semantically classifiable and may be within an environment of an object to localize. Such semantically classifiable tangible objects include, but are not limited to, roads, buildings, cars, trees, sidewalks, lane dividers, and the like. That is, a semantic image is an image that encodes semantic representations of tangible objects. As noted herein, a corresponding semantic image may be generated from a corresponding visual image via semantic segmentation. As such, the semantic image data encoded in the pixel values of the semantic pixels encode semantic labels that are associated with tangible objects that were previously imaged (via a visual image camera) based on the detections of EM waves/photons that may have been reflected from and/or emitted by, and imaged in the corresponding visual image. Semantic images encoding semantic labels are contrasted with visual images, that encode information about the detected wave's/photon's intensity, amplitude, frequency, wavelength, polarization, and/or phase. That is, the pixel values of conventional visual images encode various detected aspects waves/photons received from (i.e., reflected from or emitted by) tangible objects in the environment. In contrast to a visual map, the term "semantic map" may refer to a semantic image that is a map. That is, a semantic map is a semantic image that is associated with a coordinate system. At least based on the associated coordinate system, in addition to indicating semantic labels of tangible objects, the semantic representations included in a semantic map may indicate the absolute positions, with respect to the surface, of the corresponding tangible object. The term "semantic-domain" may refer to encoding or representing semantic representations, concepts, classes, labels, features, and/or categories. Thus, semantic images and semantic maps may be referred to as being represented in a semantic-domain. In various embodiments, a 2D map and/or 2D image may include at least some indications of the third dimension (e.g., indications of the elevations of at least some of the objects within the environment.) Such indications may be provided via contours or numerical expressions indicating the elevations. In some embodiments, such third dimensional indications may be encoded in the metadata of the 2D map and/or 2D image. Such 2D maps that indicate at least some third-dimensional indications may be referred to as "2.5D maps." Such 2D images that indicate at least some third-dimensional indications may be referred to as "2.5D images." The 2D and/or 2.5D semantic maps may additionally include various non-spatial and/or metadata. Such non-spatial metadata may include probability distributions over the semantic labels encoded in the pixel values. For example, rather than a single (most likely) semantic label being associated with a region of pixels, multiple candidate semantic labels may be associated with the pixels and characterized via a probability distribution. Such semantic oriented probability distributions may be included in the metadata of a semantic map. In a similar manner, semantic images may include metadata that encode probability distributions for multiple candidate semantic labels for the pixels. In various embodiments, the image registration methods are probabilistic, and employ the semantic oriented probability distributions included in the semantic maps and images.

As discussed in conjunction with the various embodiments, to localize an object, an aerial-view (or bird's-eye view) map is registered with a real-time aerial-view image. As used herein, the term "perspective," when applied to an image or a map, refers to the approximate viewpoint from the where the image and/or map may have been captured and/or generated from. As such, the terms "aerial-view," "aerial perspective", "bird's-eye view," and "bird's-eye perspective" of a surface are used interchangeably to refer to an elevated view, viewpoint, or perspective, of the surface, such as that would be available via a plane, unmanned aerial vehicle (e.g., a drone), satellite, or bird navigating in the airspace above the surface. In contrast to aerial-view or bird's-eye view, the terms "terrestrial-view," "terrestrial perspective," "surface-level," "surface perspective," "streel-level view," and "street-level perspective" of an environment are used interchangeably to refer to a ground-level view, or perspective, of an environment, such as that would be available via a vehicle positioned or moving on the surface of the Earth. As noted above, a corresponding aerial-view image may be generated from a terrestrial-view image via an image perspective mapping that geometrically transforms the street-level perspective pixels of the terrestrial-view image to be that of an aerial perspective.

The coordinate system associated with a map, such as a semantic map, may be a global geographic coordinate system. In associating the coordinate system with the semantic map, the spatially-discretized regions (via map pixels) of the semantic map are correlated to corresponding spatially-discretized regions of the surface (e.g., the Earth's surface) via the coordinate system. Because the coordinate system may uniquely correlate regions the Earth's surface to a set of two coordinates (encoded via two real scalars), the semantic map may be a 2D map. As noted above, the semantic map may be encoded via a 2D pixel array storing pixel values (i.e., 2D image data) that encode semantic concepts or labels. Furthermore, as noted above, the real-time semantic images that are registered with the semantic map are 2D images, where the image data is encoded via a 2D pixel array. The use of 2D maps and 2D real-time images for registration is in contrast to the registration of 3D maps and 3D images often employed by conventional 3D-feature matching localization methods. Reducing the dimensionality of both the map and the real-time images significantly decreases both the storage, communication bandwidth, and computational overhead required for storing, processing, transmitting, and registering the maps and images, as compared to conventional 3D methods.

In further contrast to conventional localization methods, the registered map and real-time images are from an aerial perspective of the surface. Conventional methods often employ a street-level perspective map and real-time images. Because depth perception is required from the street-level perspective, such conventional methods require the registration of computationally expensive 3D maps and 3D images. Registering a 2D aerial-view map with a 2D aerial-view real-time image is computationally more simple, as well as more accurate and precise, than performing 3D registrations from a street-level perspective.

As also contrasted with conventional localization methods, the registered map and real-time images here are represented in the semantic domain. As noted throughout, conventional localization methods often register a map and real-time images that are encoded in the visual domain. To render the large amount of colors required for visual images, the pixel depth of conventional visual images may be 24, or even 48 bits. In contrast, because the cardinality of the set of possible semantic labels required for a semantic image/map is significantly less than the cardinality of the set of possible colors rendered via visual images, the pixel depth of semantic images and maps may be significantly less than the pixel depth of conventional visual images. Accordingly, the storage, communication bandwidth, and computational overhead required for storing, processing, transmitting and registering the semantic maps and images, as compared to visual images and maps, is further decreased. As another example, the semantical labels of the semantic maps/images may have a lower variance than the corresponding conventional visual labels. In a semantic map/image, each pixel belonging to a patch of grass may be be uniformly labeled with single (repeated) semantical label (formally having zero variance within patch) making it very easy to compress. On the other hand, the same patch of grass in the conventional visual-domain may have a range of grass colors alongside different shading, and thus having much higher variance in contrast to semantical representation, making lossless data compression difficult. Thus, semantic images/map may be significantly more compressible (i.e., include less information) than their visual-domain counterparts. Also, the accuracy and precision of the registration is significantly increased in a 2D aerial perspective semantic-domain, as compared to the conventional 3D street-level perspective visual domain. The reduction in stored information and computational complexity, as well as increase in the reliability, accuracy, and precision of the localizations, are especially salient for real-time localization applications, such as but not limited to, the safe, legal, and efficient control of autonomous vehicles.

The reliability, accuracy, and precision of the enhanced embodiments here is further increased over conventional methods. As noted above, some conventional methods rely on LIDAR, or other laser-scanning techniques, whose performance may be degraded due to inclement weather and other environmental conditionals. As also noted above, the performance of satellite-based localization methods may also be degraded due to inclement weather and/or environmental conditions. Furthermore, the embodiments herein provide significantly more localization reliability, accuracy, and precision than that associated with conventional signal-triangularization methods. For example, triangulation-based methods cannot orient an object unless the object is in motion, and the direction of motion is a function of the object's orientation. Also, employing all (or at least most of) the semantically-labeled pixels for the localization (that is, applying dense registration methods) also increases accuracy and is in contrast to conventional approaches. Because the dense registration is performed in the semantic domain, the dense registration of the various embodiments may be referred to as dense semantic registration.

A used herein, the terms "image registration" and "registration" are used synonymously to refer any method and/or technique of spatially aligning at least two images. For example, a first image of a region of surface and a second image of at least a portion of the region of the surface may be registered when the first and second images are form a similar viewpoint and/or perspective, e.g., an aerial-view perspective. When registering the first image and the second image, corresponding features (within the portion of the surface's region) imaged in the first image are spatially aligned with corresponding features (within the portion of the surface's region) imaged in the second image. That is, the features of the first image are spatially correlated with the corresponding features of the second image. As such, the second image may be aligned and/or positioned to overlay at least a position of the first image. Alternatively, the second image may be aligned and/or positioned to overlay at least a position of the second image. The correlations and/or alignments may be performed via various analysis of the pixel values of the two images. When registered two images, at least one of the two images may be upsampled and/or downsampled such that the pixel resolution of the two images is at least similar. That is, the resolution of at least one of the two images may be updated such that the spatially-discretized regions depicted in the two images are of at least a similar spatial dimension. In various embodiments, the image registration methods are probabilistic. These probabilistic methods employ the semantic oriented probability distributions that may be encoded in the metadata of the semantic maps and images.

In the various embodiments, an aerial-view map and a real-time aerial-view image may be registered. As noted above, maps are associated with a coordinate system. Because the pixel spatial-resolutions of the map and image are at least similar, once registered, the coordinate system of the map may be associated with the pixels of the real-time image. As such, a unique spatially-discretized region (i.e., a location) may be associated with each pixel of the registered real-time image. Based on knowledge of the field-of-view (FOV) of an imaging system that captured a real-time visual image that was employed to generate the real-time aerial-view, the location and orientation of the imagining system may be determined on the aerial-view map via the coordinate system. For example, a vehicle that includes such an imaging system may be localized via the registration of an aerial-view semantic map and drive-time aerial-view images of the vehicle's environment. As noted throughout, the map and real-time image registrations performed herein may be performed in the semantic-domain. That is semantic features included in the aerial-view semantic map are correlated with semantic features on the real-time aerial images of an object.

Example Operating Environment

FIG. 1 illustrates an enhanced object localization system 100 implementing various embodiments presented herein. System 100 includes one or more various computing devices, such as but not limited to semantic map engine (SME) computing device 102 and client computing device 108. As shown in FIG. 1, SME computing device 102 hosts and/or implements a SME application 140. SME 140 is generally responsible for generating a semantic map via the various embodiments described herein. System 100 also includes an object to localize. In the non-limiting embodiment of FIG. 1, the object to localize is a vehicle 104. In some non-limiting embodiments, vehicle 104 may be an autonomous, or at least semi-autonomous, vehicle. Vehicle 104 may be enabled to (autonomously or semi-autonomously) drive and/or navigate over at least the drivable portions of the surface of the Earth 130. Although not shown in FIG. 1, vehicle 104 may include an imaging system that is enabled is capture drive-time terrestrial-view visual images of vehicle's 104 environment. The imaging system of vehicle 104 may include any combination of one or more visual image cameras. Various embodiments of vehicle embedded imaging systems are discussed in conjunction with at least FIG. 4. Vehicle 104 also includes a computing device, such as but not limited to navigation computer 106. Navigation computer 106 may host and/or implement a localization engine (LE) application 160. LE 160 is generally responsible for employing the drive-time terrestrial-view visual images captured by the imagining system and the semantic map generation by SME 140 to determine a real-time (or drive-time) localization of vehicle 104 via the various embodiments discussed herein. Various embodiments of computing devices, such as, but not limited to, SME computing device 102, navigation computing device 106, and client computing device 108, are discussed in conjunction with computing device 1100 of FIG. 11.

System 100 may include a fleet of mobile-imagining service providers 120. The service providers 120 may include, but are not limited to, autonomous or semi-autonomous land vehicle 122, unmanned aerial vehicle (UAV) 124 (e.g., a drone), Earth-orbiting satellite 126, and airplane 128. The service providers 120 include imaging systems that may include any combination of one or more visual image cameras. Although not shown explicitly in FIG. 1, each of the mobile-imaging service providers 120 may include a computing device. For example, the included computing device may be similar to the navigation computer 106. The control and/or navigation of at least some of the mobile-imaging service providers 120 may be autonomous, or at least semi-autonomous via the included navigation computing device. Mobile-imaging service providers are generally responsible for surveying the Earth's surface, as well as capturing and/or generating aerial-view and/or terrestrial-view visual images of the Earth's 130 surface. SME 140 employs these images to generate the semantic map of the Earth's 130 surface.

System 100 may include one or more image and/or map databases, such as but not limited to image/map database 112. Image/map database 112 may store and/or archive any of the visual or semantic images or maps discussed herein. Image/map database 112 may store any training data employed to train any of the neural networks (or other machine learning and/or machine vision components) discussed herein. A user may employ client device 108 to manually annotate and/or label any such training data with ground-truth labels. The user may additionally employ client device 108 to manually correct and/or edit any segmentation errors in the semantic map.

A general or specific communication network, such as but not limited to communication network 110, may communicatively couple at least a portion of computing devices 102, 106, 108, mobile-imaging service providers 120, and one or more image/map databases, including but not limited to image/map database 112. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to allow computing devices to exchange information.

Image/map database 112 may be implemented by a storage device that may include volatile and non-volatile storage of digital data. A storage device may include non-transitory storage media. Communication network 110 may communicatively couple image/map database 112, or any other storage device, to at least a portion of computing devices 102, 106, and 108, as well as any of mobile-imaging service providers 120. In some embodiments, image/map database 112 may be stored on a storage device distributed over multiple physical storage devices. Thus, image/map database 112 may be implemented on a virtualized storage device. For instance, one or more "cloud storage" services and/or service providers may provide, implement, and/or enable image/map database 112. A third party may provide such cloud services.

Semantic Map Engine

Various embodiments of a semantic map engine (SME) application, such as, but not limited to, SME 140 of FIG. 1 will now be discussed. As indicated, SME 140 is generally responsible for generating a two-dimensional (2D) aerial-view semantic map of the Earth's 130 surface from (aerial-view and/or terrestrial-view) visual images. At least a portion of the visual images may be provided via one or more of the mobile-imaging service providers 120. In some embodiments, SME 140 may include a visual image processor 142, a visual image semantic segmenter 144, an inverse perspective mapper 146, a semantic map generator 148, a semantic map updater 150, and a semantic map provider 152. Visual image processor 142 is generally responsible for receiving the (aerial-view and/or terrestrial-view) visual images. Visual image processor 142 may receive at least a portion of these images via service providers 120 and/or image/map database 112. Visual image processor 112 may process such images. Visual image processor 142 may apply any digital image processing techniques and/or methods required on the visual images. For example, the received visual images may be up-sampled, down-sampled, color-corrected, cropped, normalized, filtered, convolved, layered, combined, composited, or virtually any other such imaging processing action. Visual image processor 142 may combine multiple aerial-view images to generate a larger view of the surface than a single aerial-view image could encode. Visual image processor 142 may associate a coordinate system, such as a global coordinate system, with each aerial-view visual image.

Visual image semantic segmenter 144 is generally responsible for semantically segmenting the visual images to generate corresponding semantic images. Semantic segmenter 144 may employ a neural network, such as a deep learned convolutional neural network (CNN) to perform the semantic segmentation. In some embodiments, the CNN of visual image semantic segmenter 144 may be trained (via ground-truth labeled training data and supervised machine learning training methods) to semantically segment aerial-view visual images. In other embodiments, the CNN of visual image semantic segmenter 144 may be trained to semantically segment terrestrial-view (or street-level) visual images. In at least one embodiment, the CNN of visual image semantic segmenter may be trained to semantically segment both aerial-view and terrestrial-view visual semantic images. In at least one embodiments, image semantic segmenter 144 may be enabled, at least partially, via a human operator that manually labels (or corrects automatically mislabeled regions) of the semantic map.

Figure 2:
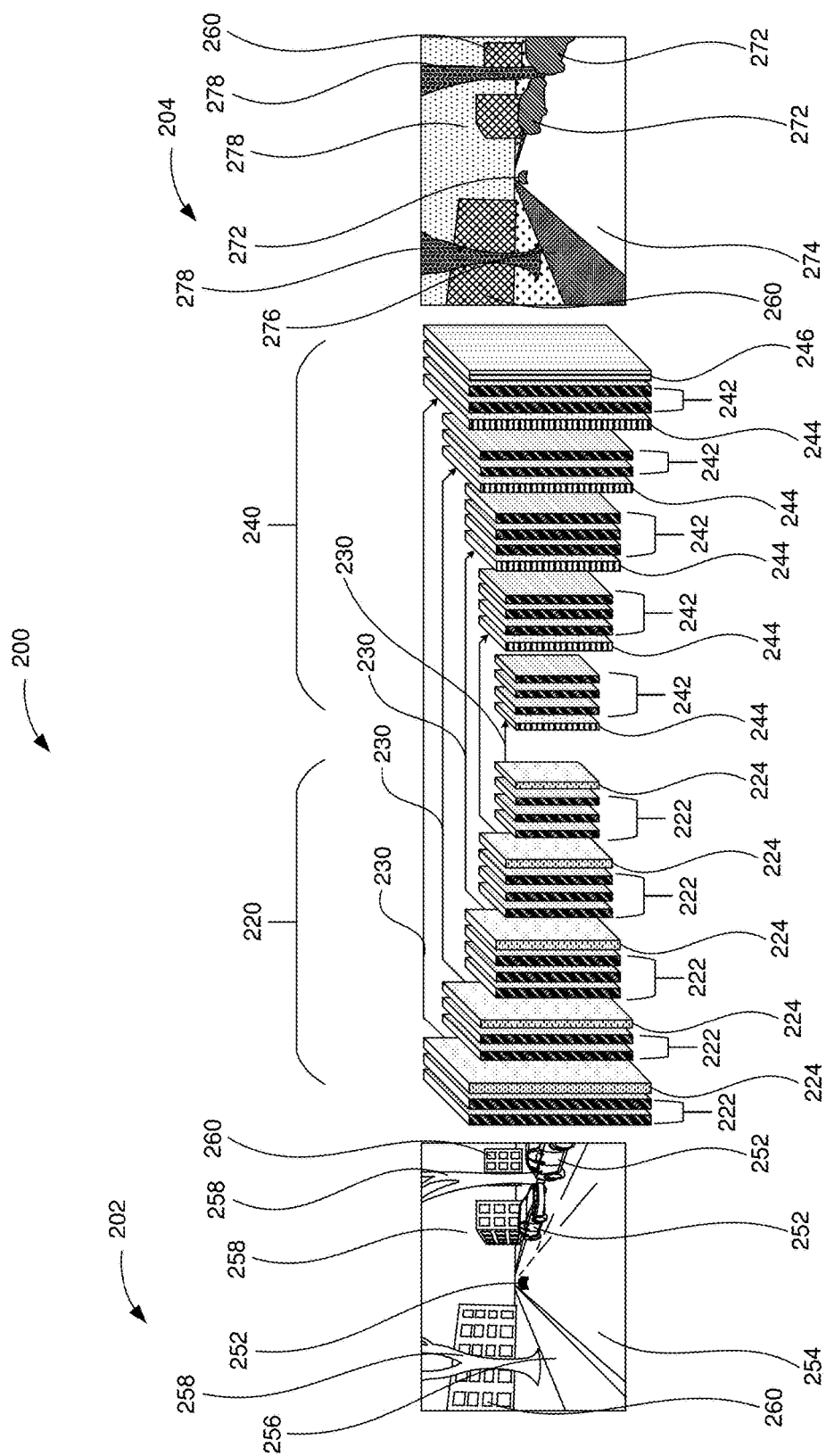
FIG. 2 schematically illustrates a convolutional neural network that generates a semantic image by semantically segmenting a corresponding visual image.

FIG. 2 schematically illustrates a CNN 200 that may generate a semantic image by semantically segmenting a corresponding visual image. Visual image semantic segments 144 may include and/or employ a CNN similar to CNN 200 to semantically segment the visual images. More specifically, CNN 200 implements a fully convolutional network (FCN) architecture that semantically segments an input visual image 202 to generate a corresponding output semantic image 204. CNN 200 includes encoder (or downsampling) layers 220 and decoder (upsampling) layers 240. The encoding layers 220 are generally responsible for detecting and/or recognizing features (e.g., latent and/or hidden features), via convolution operations, in visual input 202 and encoding the features within a representation of the imager (e.g., a vector embedding). Thus, encoder layers 220 may be referred to as encoding layers. The encoded representation of input image 202 generally includes less information than the visual representation of input image 202 (i.e., pixel values). Thus, the encoding layers 220 may downsample input image 202. The decoder layers 240 are generally responsible for decoding the downsampled representation of input image and generate the semantic output image 204, via deconvolution operations (i.e., transposing the convolution operations of the encoding layers 220). That is, decoder layers 240 decode the representation of input image 202 via upsampling to generate semantic output image 204. Thus, decoder layers 204 may be referred to as decoding layers 240.

Note the symmetrical architecture across the encoding/decoding 220/240 layers. The encoding layers 220 include downsampling batch normalized convolution layers 222 and the decoding layers 240 include correspondingly upsampling batch normalized transposed convolution layers 242. In various embodiments, the downsampling convolution layers 222 and upsampling transposed convolution layers 242 may include rectified linear units (ReLU) to include an activation function and improve the performance of the semantic segmentation. Each encoding convolution layer 222 may include a pooling layer 224 to enable at least a portion of the downsampling of input image 202. In contrast, each decoding transposed convolution layer 242 may include an upsampling layer 244 to invert the effects of the pooling layers 224. A softmax function layer 246 may be employed to enable semantically classifying (or labeling) each region of the segmented image 204. Skip connection 230 between corresponding encoding layers 220 and decoding layers 240 may be employed to improve the performance of the semantic segmenting. CNN 200, or another similar FCN architecture, may be trained to semantically segment visual images via various supervised learning methods.

Note that the input terrestrial-view visual image 202 displays visual representations or depictions, such as vehicles 252, a road 254, a sidewalk 256, trees 258, and buildings 260. The outputted terrestrial-view semantic image 204 shows the corresponding semantic representations that indicate semantic labels via coloring (greyscale) coding of the pixels associated with the corresponding semantic representations: vehicles 272, roads (or drivable surfaces) 274, sidewalks (or non-drivable surfaces) 276, trees 278, and buildings 280. CNN 200 may similarly semantically segment aerial-view visual images.

Figure 3A:
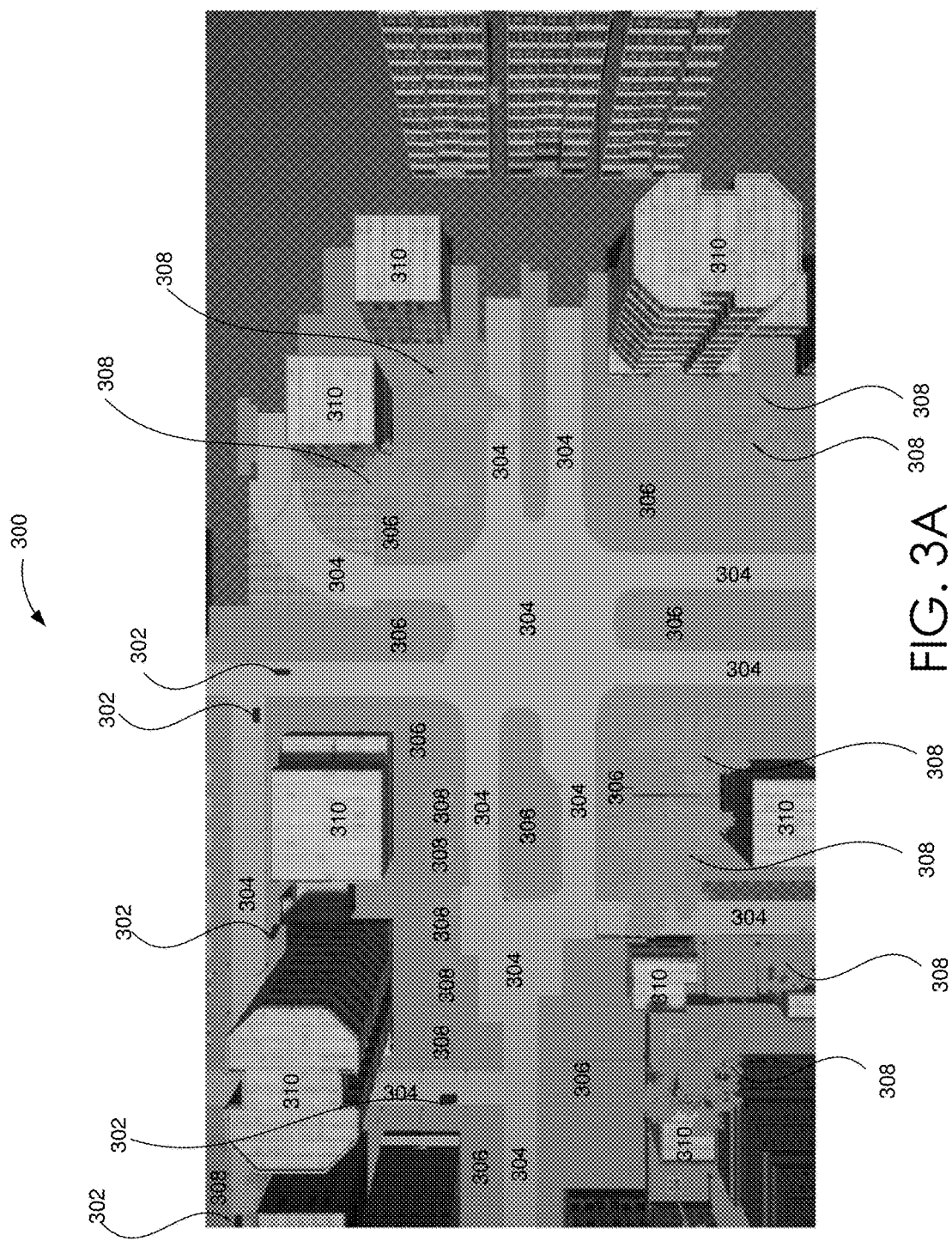
FIG. 3A illustrates an exemplary aerial-view semantic map that is consistent with the various embodiments.
Figure 3B:
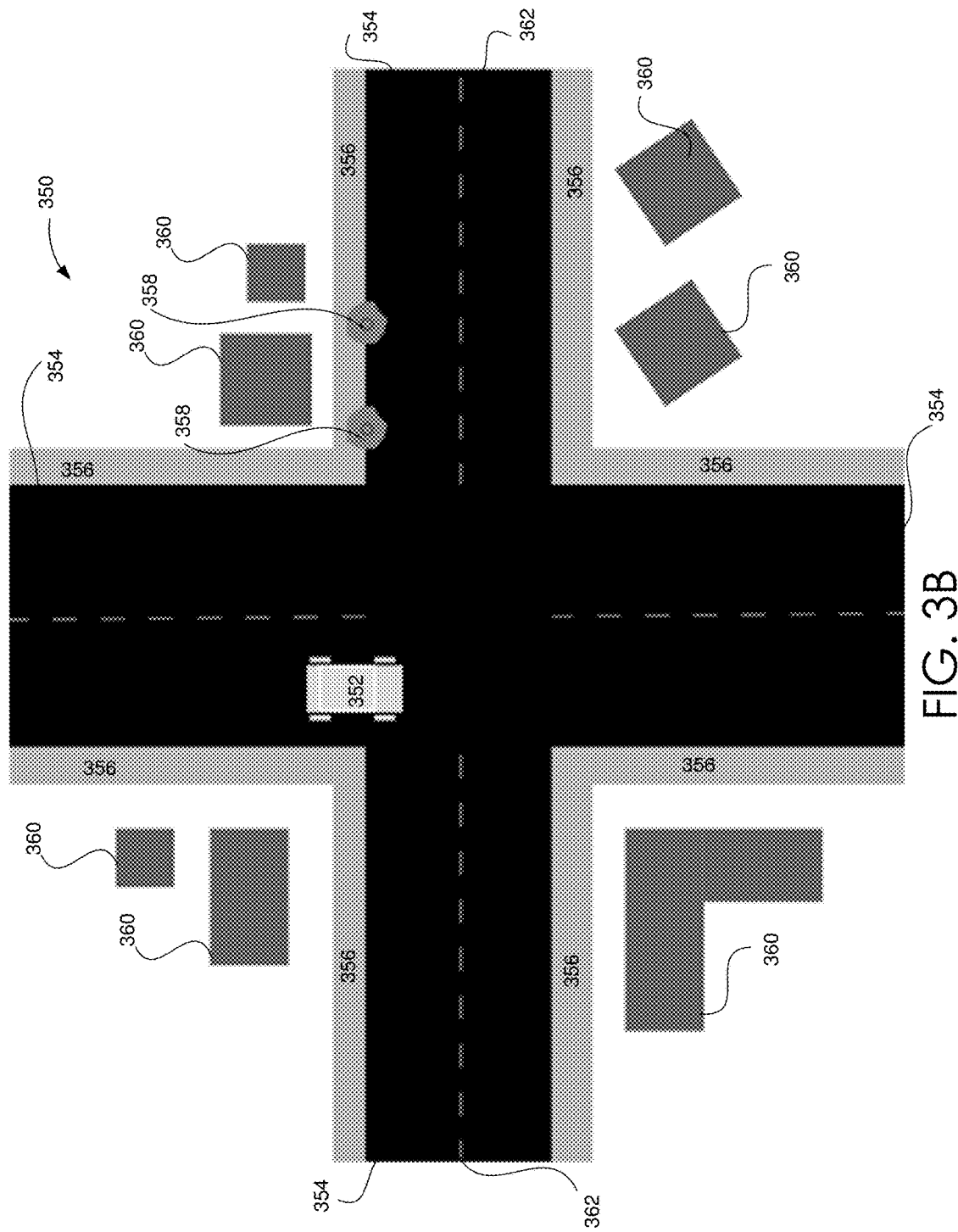
FIG. 3B illustrates another exemplary aerial-view semantic map that is consistent with the various embodiments.

Returning to FIG. 1, semantic map generator 148 is generally responsible for generating an aerial-view semantic map from the aerial-view semantic images. FIG. 3A illustrates an exemplary aerial-view semantic map 300 that is consistent with the various embodiments. As such, semantic map generator 148 may generate semantic map 300. Aerial-view semantic map 300 includes and/or indicates semantic representations of vehicles 302, roads (or drivable surface) 304, sidewalks (or non-drivable surfaces) 306, trees 308, and buildings 310. Note that the buildings 310 are not technically semantically segmented, and are shown in order to illustrate the relationships between the objects in the map. In such embodiments, localization may be performed employing on the roads 304, sidewalks 306, and trees 308. Note that these semantic representations indicate a semantic label for the objects (as indicated via color (or greyscale) coding of the corresponding semantically semantic representations. The semantic representations also included and/or indicate the absolute positions of the objects, with respect to the surface of the Earth, via the associated coordinate system. FIG. 3B illustrates another exemplary aerial-view semantic map 350 that is consistent with the various embodiments. Semantic map generator 148 may generate semantic map 350. Aerial-view semantic map 350 includes and/or indicates semantic representations of vehicles 352, roads (or drivable surface) 354, sidewalks (or non-drivable surfaces) 356, trees 358, buildings 360, and lane dividers 362. Similar to aerial-view semantic map 300 of FIG. 3A, the semantic representations of aerial-view semantic map indicate and/or include a semantic label and an absolute position of the objects.

Returning to FIG. 1, inverse perspective mapper 146 is generally responsible for transforming the perspective of terrestrial-view images to generate aerial-view images to then generate the semantic map. Various embodiments of an inverse perspective mapper are discussed in conjunction with inverse perspective mapper 170 of LE 160. However, briefly here, inverse perspective mapper may perform a geometric transform on the pixels of a terrestrial-view image to transform the terrestrial-view image to an aerial-view image. Image perspective mapper 146 may include a neural network that enables the geometric transformation of the pixels. In some embodiments, the neural network is trained to geometrically transform the visual pixels of terrestrial-view visual images to visual pixels of aerial-view visual images. In other embodiments, the neural network may be trained to transform the semantic pixels of terrestrial-view semantic images to semantic pixels of aerial-view semantic images. In at least one embodiment, the neural network is trained to geometrically transform both visual pixels and semantic pixels. In at least one embodiment, the inverse perspective mapper 170 may employ depth information to 3D reconstruct, three-dimensionally, the positions of the pixels in 3D space and then use such a reconstruction to project the pixels onto the aerial-view.

In some embodiments, a mobile-imaging service provider 120, such as but not limited to autonomous (or semi-autonomous) vehicle 122 may survey at least a portion of the Earth's 130 surface and capture terrestrial-view visual images of the environment. In some embodiments, the terrestrial-view visual images or stereoscopic images and/or 3D images are generated via stereoscopic and/or 3D imaging systems embedded in the mobile-imaging service provider 120. Due to the increased resolution in depth perception, stereoscopic and/or 3D terrestrial-view images may enable more accurate transformations to the aerial perspective. As discussed in conjunction with at least FIGS. 6A-6B, inverse perspective mapper 146 may rotate the perspective of the terrestrial-view visual image to an aerial perspective and generate a corresponding aerial-view visual image. The visual image semantic segmenter 144 may semantically segment the perspective-transformed visual image to generate a corresponding aerial-view semantic image. In at least one embodiment, visual image sematic segment 144 semantically segments the terrestrial-view visual images to generate terrestrial-view semantic images. Inverse perspective mapper 146 rotates the perspective of the terrestrial-view semantic images to generate the aerial-view semantic images. Semantic map generator 148 may employ the corresponding aerial-view semantic image to generate the semantic map. In at least some embodiments, the visual image semantic segmenter 144 may semantically segment the terrestrial-view visual image to generate a corresponding terrestrial-view semantic image. The inverse perspective mapper 146 may rotate the perspective of the terrestrial-view semantic image to generate the corresponding aerial-view semantic image, which is employed to generate the semantic map.

Semantic map updater 150 is generally responsible for updating the semantic map. For instance, SME 140 may periodically receive updated visual images as the drivable areas of the surface change over time. Semantic map updater 150 updates the generated semantic map based on the updated images. In some embodiments, a user may employ client device 108 to manually update and/or edit the semantic map via semantic map updater 150. The user may update and/or edit segmenting errors generated by visual image semantic segmenter 144. Semantic map provider 152 is generally responsible for providing the semantic map, or portions thereof, to an object to be localized, such as but not limited to vehicle 104.

Localization Engine

Figure 4:
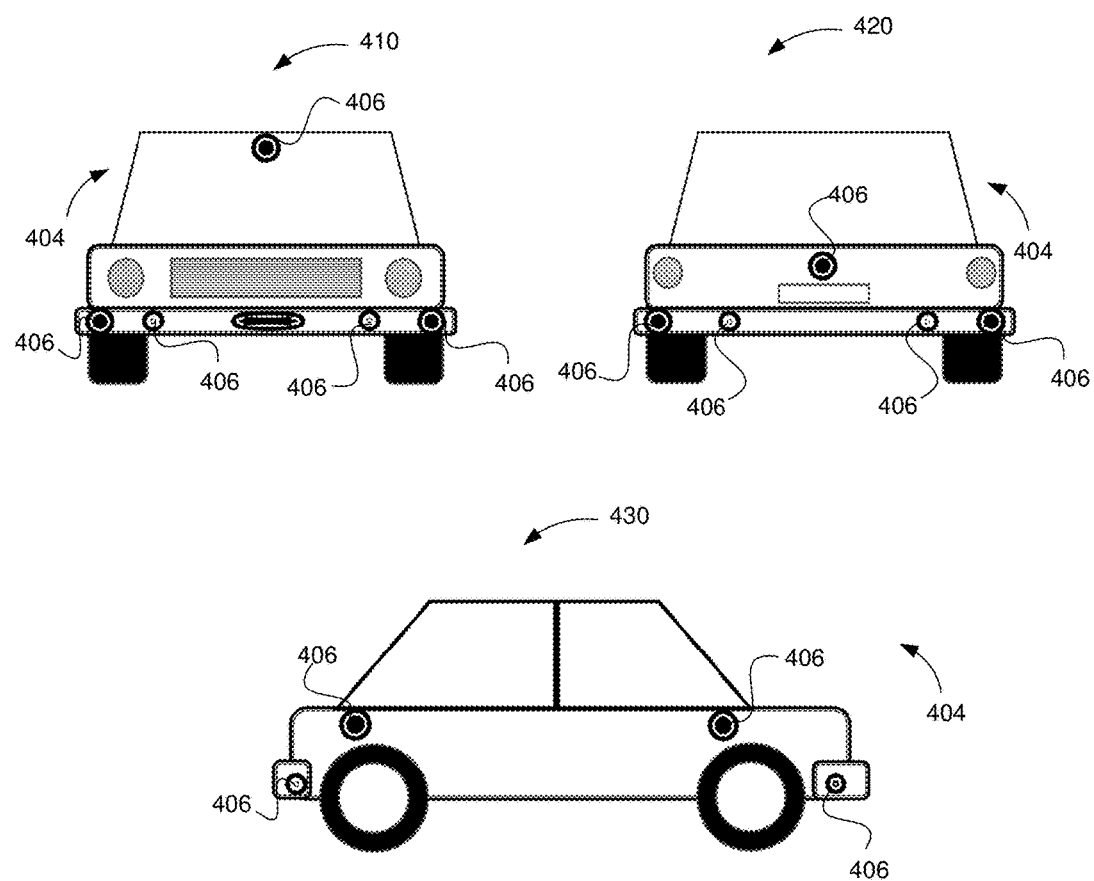
FIG. 4 schematically illustrates a vehicle that includes an imaging system that captures terrestrial-view visual images of the vehicle's environment.

Various embodiments of a localization engine (LE) application, such as, but not limited to, LE 160 of FIG. 1 will now be discussed. As indicated above, LE 160 is generally responsible for employing a 2D aerial-view semantic map, such as a 2D aerial-view semantic map generated by SME 140, and drive-time terrestrial-view visual images captured by an imaging system included in vehicle 104. FIG. 4 schematically illustrates a vehicle 404 that includes an imaging system that captures terrestrial-view visual images of the vehicle's environment. More specifically, FIG. 4 shows front view 410, a back view 420, and a side view 430 of vehicle 404. The imaging system of vehicle 404 may be a visual imaging system that includes one or more visual cameras 406 that are enabled to generate visual image data that visually depicts the environment of vehicle 404 from a street-level perspective. The imaging devices (i.e., a visual cameras 406) of the visual imaging system may include one or more of cameras that detect visual wavelengths, infrared (IR) cameras, ultraviolet (UV) cameras, radio-frequency (RF) detectors, microwave detectors, and the like. The visual cameras 406 may also include light detection and ranging (LIDAR) cameras, time-of-flight (TOF) cameras, or other laser-scanning-based cameras. The visual cameras 406 may include stereoscopic and/or 3D cameras that generate stereoscopic and/or 3D visual images. Terrestrial-view stereoscopic and/or 3D images may enable greater accuracy when street-level perspective of the terrestrial-view images is rotated to an aerial-view via image perspective mapping. Although not shown in FIG. 4., vehicle 404 may include a computing device, such as but not limited to navigation computing device 106 of FIG. 1. Vehicle 104 and/or mobile-imaging service-provider vehicle 122 of FIG. 1 may include an imaging system that is similar to the imaging system of vehicle 404. Note the positions and/or location of the various imagers/visual cameras included in the imaging system on vehicle 404, as shown in FIG. 4 are for illustrative purposes only. Other configurations and numbers of imagers/visual cameras are possible. The imagining system of vehicle 404 may provide visual images (encoded in visual image data structured via pixel values stored in 1D, 2D, or 3D pixel arrays) to a localization engine, such as but not limited to LE 160 of FIG. 1.

Referring back to FIG. 1, LE engine 160 may include a coarse localizer 162, a semantic map requester/receiver 164, a visual image analyzer 166, and a visual image semantic segmenter 168. LE engine 160 may additionally include an inverse perspective mapper 170, a semantic image/map register 172, and a fine localizer 174. Coarse localizer 162 is generally responsible for determining a coarse localization of vehicle 104. Determining a coarse localization may include determining an approximate position or location of vehicle 104 on the surface of the Earth 130. Determining the coarse localization of an object, such as vehicle 104 may be enabled via various signal triangularization methods. Vehicle 104 and/or navigation computer 106 may be equipped with a signal receiver for a Global Navigation Satellite System (GNSS) system. For example, vehicle 404 may be equipped with a Global Positioning System (GPS) receiver.

Semantic map requester/receiver 164 is generally responsible for requesting and receiver a semantic map, such as but not limited to at least a portion of an aerial-view semantic map generated by SME 140. Coarse localizer 162 may provide the coarse localization of vehicle to semantic map requester/receiver 164. Based on the approximate location of vehicle 104, as indicated via the coarse localization, semantic map requester/receiver 164 may request a portion of an aerial-view semantic map from semantic map provider 152 of SME 140. Semantic map provider 152 may transmit a portion of a semantic map that corresponds to the coarse localization of vehicle 104 to the semantic map requester/receiver 164. The portion of the provided semantic map may be a map of the surface of the Earth 130 that includes the approximate location of vehicle 104. For example, semantic map requester/receiver 164 may receive aerial-view semantic map 300 of FIG. 3A or aerial-view semantic map 350 of FIG. 3B. The portion of the provided semantic map may be large enough to compensate for any errors and/or uncertainties in the coarse localization. For example, uncertainties in the coarse localization may be on the order or tens of meters. However, each dimension of the provided portion of the semantic map may cover surface within miles, or even tens or hundreds of miles. Because, as discussed throughout, the information required to encode semantic maps (as compared to conventional visual maps) is reduced, based on the communication bandwidth provided via communication network 110, a larger portion of the semantic map may be provided to LE 160 than would be possible for a convention visual map.

Visual image analyzer 166 may analyze visual images provided by the imaging system of vehicle 104, such as but not limited to the visual imagining system included in vehicle 404 of FIG. 4. Visual image analyzer 166 may prepare the terrestrial-view visual images (captured via visual imagers of vehicle 104) for semantically segmenting (via visual image semantic segmenter 168) and transforming from the street-level perspective to an aerial-view perspective (via inverse perspective mapper 170). For example, visual image analyzer 166 may process stereoscopic and/or 3D images to generate and/or transform pixel values stored in 3D or 2D arrays of pixels. Visual image analyzer 166 may correct and/or transform some depth-perception information encoded in the terrestrial-level visual images. Visual image analyzer 166 may process such images. Visual image analyzer 166 may apply any digital image processing techniques and/or methods required on the visual images. For example, the received visual images may be up-sampled, down-sampled, color-corrected, cropped, normalized, filtered, convolved, layered, combined, composited, or undergo virtually any other such image processing action. Visual image analyzer 166 may combine multiple terrestrial-view images to generate a larger view of vehicle's 104 environment.

Figure 5A:
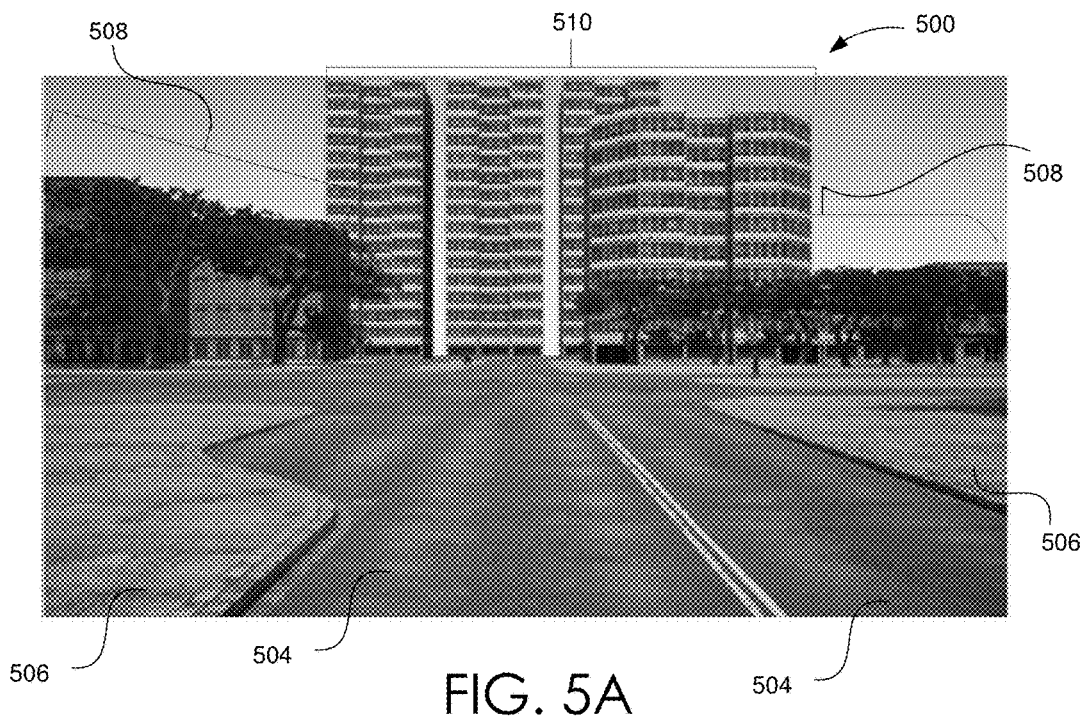
FIG. 5A illustrates an exemplary terrestrial-view visual image that is consistent with the various embodiments.

Visual image semantic segmenter 168 is generally responsible for semantically segmenting the terrestrial-view visual images of a vehicle's environment to generate terrestrial-view semantic images of the environment. As such, visual image semantic segmenter 168 may be similar to and/or include similar functionalities of visual image semantic segmenter 144 of SME 140. That is, visual image semantic segmenter 168 may include a deep learned convolutional neutral network (CNN) that is trained to semantically segment visual images. For example, visual image semantic segmenter may include a CNN that is similar to CNN 200 of FIG. 2. FIG. 5A illustrates an exemplary terrestrial-view visual image 500 that is consistent with the various embodiments. Terrestrial-view visual image 500 may have been captured by the imaging system of vehicle 104 and is an image in the visual-domain of the street-level perspective of vehicle's 104 environment. That is, terrestrial-view visual image 500 may be a real-time and/or a drive-time terrestrial-view visual image. In at least one embodiment, mobile-imaging service provider vehicle 122 may have been employed to capture terrestrial-view visual image 500. Terrestrial-view visual image 500 includes visual representations of a drivable road 504, sidewalks (or non-drivable surfaces) 506, various trees 508, and various buildings 510.

Figure 5B:
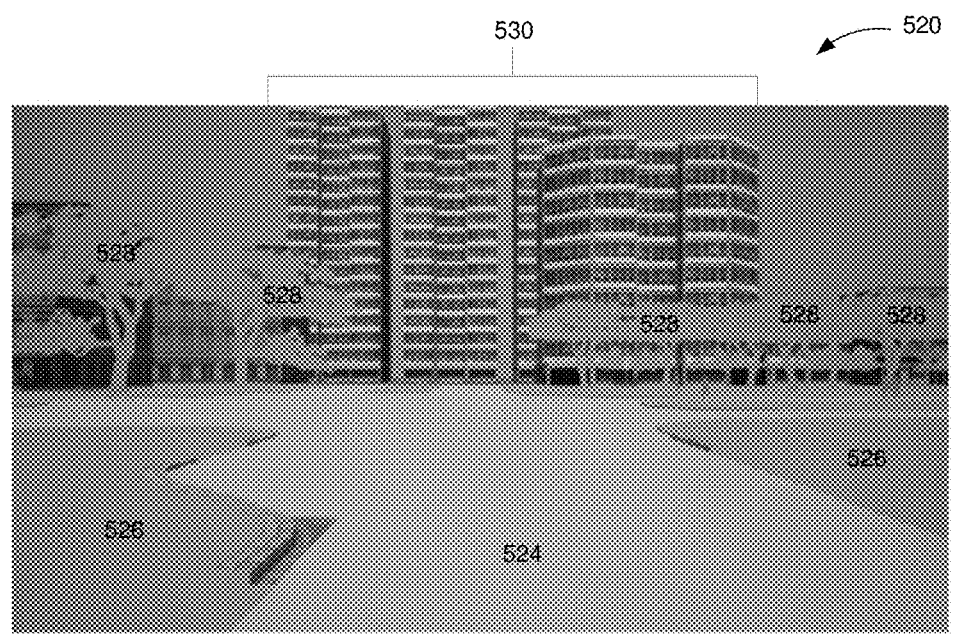
FIG. 5B illustrates an exemplary terrestrial-view semantic image generated by semantically segmenting the terrestrial-view visual image of FIG. 5B.

FIG. 5B illustrates an exemplary terrestrial-view semantic image 520 generated by semantically segmenting the terrestrial-view visual image 500 of FIG. 5A. For example, either visual image semantic segmenter 144 of SME 140 or visual image semantic segmenter 168 may be enabled to semantically segment terrestrial-view visual image 500 of FIG. 5A to generate terrestrial-view semantic image 520 of FIG. 5B. As such, terrestrial-view semantic image 520 may be a real-time and/or a drive-time terrestrial-view semantic image Terrestrial-view semantic image 520 includes semantic representations, in the semantic-domain, that correspond to visual-domain representations of visual image 500, including the semantically labeled drivable road 524, sidewalks (or non-drivable surfaces) 526, various trees 528, and various buildings 530. Note that the semantic representations of terrestrial-view semantic image 520 indicates the semantic labels corresponding to objects, via the color and/or greyscale of pixels associated with the objects.

Figure 5C:
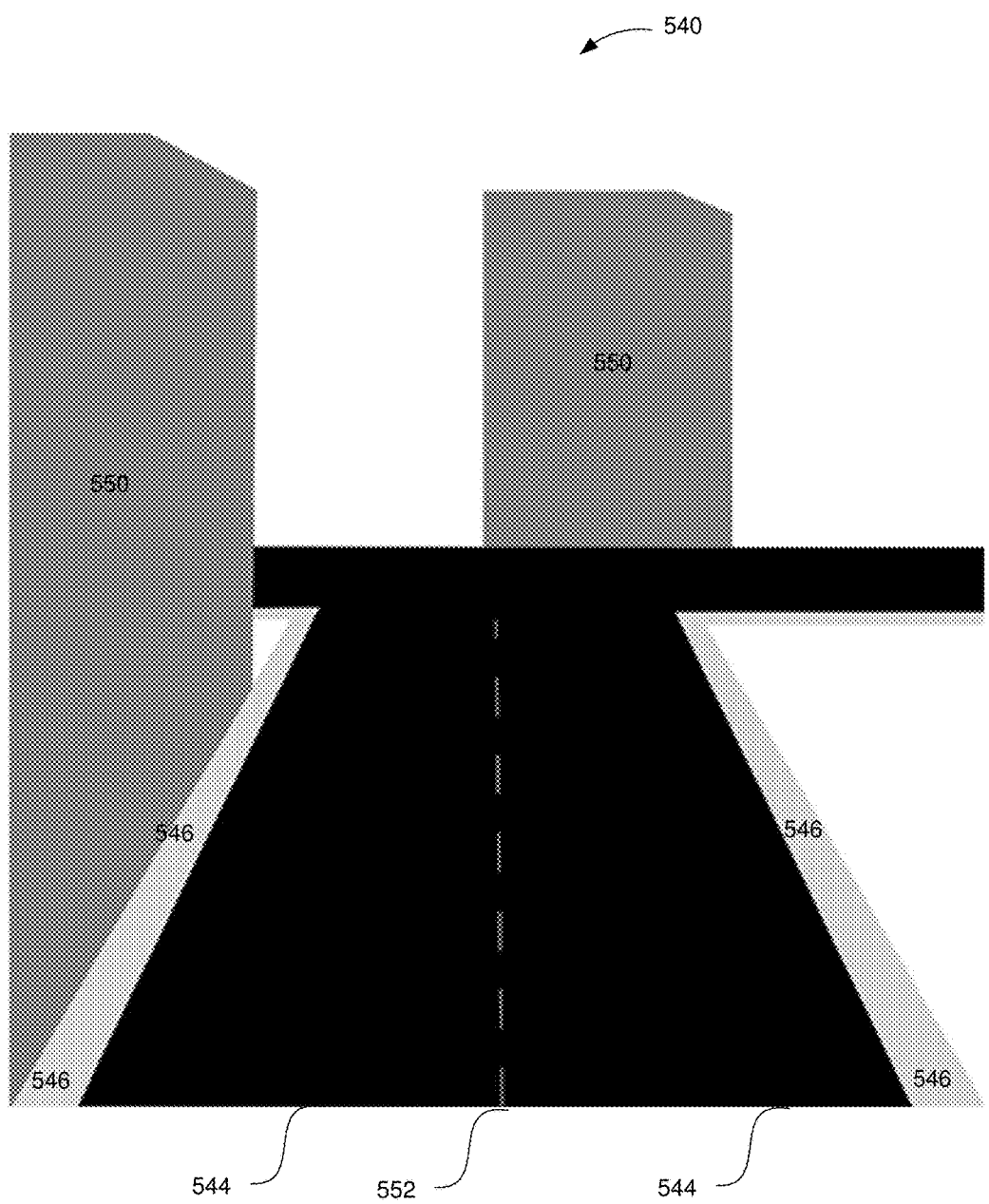
FIG. 5C illustrates another exemplary terrestrial-view semantic image that is consistent with the various embodiments.

FIG. 5C illustrates another exemplary terrestrial-view semantic image 540 that is consistent with the various embodiments. Similar to semantic image 520, terrestrial-view semantic image 540 may be generated, via one of either visual image semantic segmenter 144 of SME 140 or visual image semantic segmenter 168 of LE 160, by semantically segmenting a corresponding real-time and/or drive-time terrestrial-view visual image. As such, terrestrial-view semantic image 540 may be a real-time and/or a drive-time terrestrial-view semantic image. Note that at least in some embodiments, visual image semantic segmenter 168 may semantically segment one or more aerial-view visual images in a similar manner. Terrestrial-view semantic image 540 includes semantic representations of a road 544, a sidewalk 546, a lane divider 552, and various buildings 550.

Inverse perspective mapper 170 is generally responsible for inverting the terrestrial-view perspective of at least one of the terrestrial-view visual images captured by vehicle 104 or the terrestrial-view semantic images generated from the terrestrial-view visual images captured by vehicle 104. In some embodiments, inverse perspective mapper 170 transforms the street-level perspective of real-time and/or drive-time terrestrial-view semantic images generated by visual image semantic segmenter 168 into real-time and/or drive-time aerial-view perspective. In other embodiments, inverse perspective mapper 170 transforms the street-level perspective of the real-time and/or drive-time terrestrial-view visual images captured via the visual imaging systems included in vehicle 104 into a real-time and/or drive-time aerial-view visual perspective. That is, inverse perspective mapper 170 generates real-time and/or drive-time aerial-view visual images from real-time and/or drive-time terrestrial-view visual images. In such embodiments, visual image semantic segmenter 168 may be employed to semantically segment the real-time and/or drive-time aerial-view visual images and generate corresponding real-time and/or drive-time aerial-view semantic images. As such, inverse perspective mapper 170 may be similar to, or at least include similar functionalities to, inverse perspective mapper 146 of SME 140. As discussed in conjunction with inverse perspective mapper 146, inverse perspective mapper 170 may transform the terrestrial-view perspective to an aerial-view perspective via geometric transformations of the pixels in the terrestrial-view image. As such, a neural network included in the inverse perspective mapper may be trained to at least partially enable such geometric transformations. As discussed above with respect to inverse perspective mapper 146. Inverse perspective mapper 170 may employ stereoscopic, or other depth-related, information to generate the aerial-view.

Figure 6A:
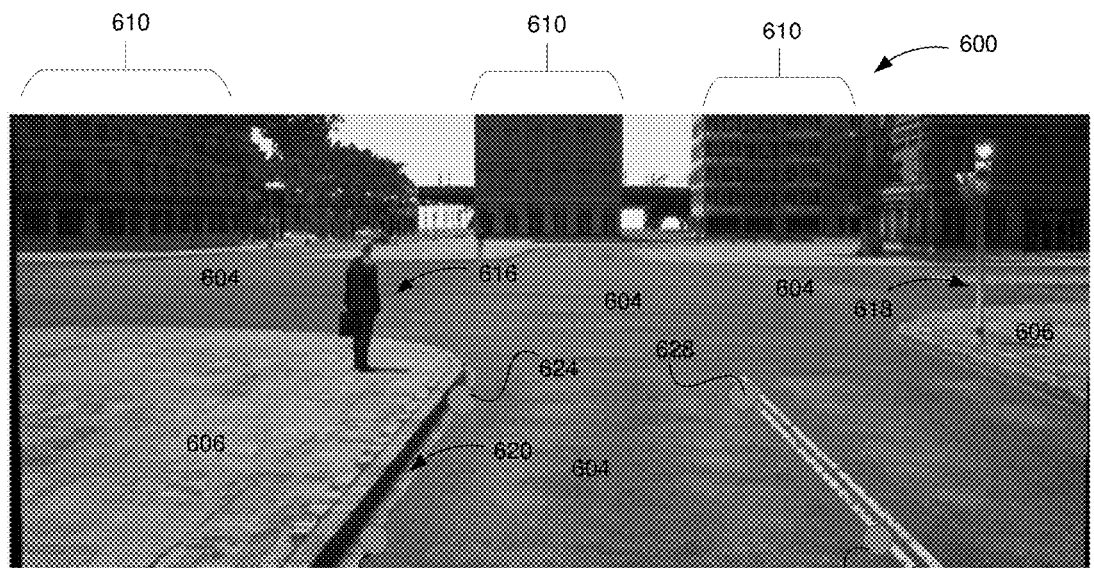
FIG. 6A illustrates another exemplary terrestrial-view visual image that is consistent with the various embodiments.
Figure 6B:
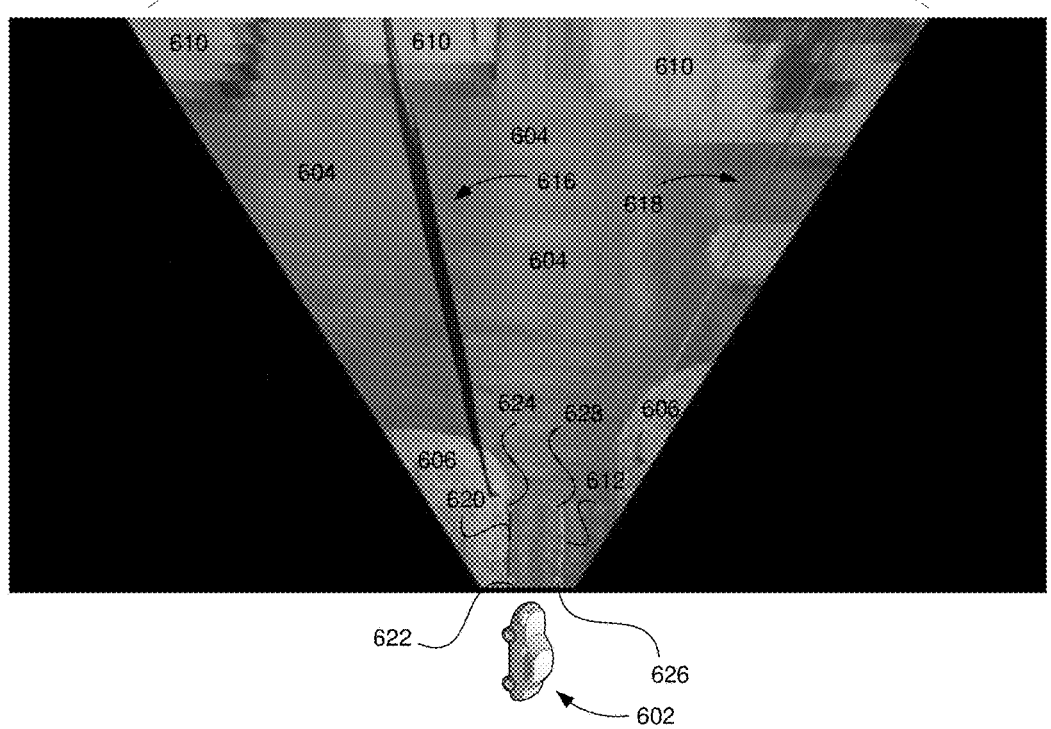
FIG. 6B illustrates an exemplary aerial-view visual image generated by image perspective mapping the terrestrial-view visual image of FIG. 6A.

FIG. 6A illustrates another exemplary terrestrial-view visual image 600 that is consistent with the various embodiments. Terrestrial-view visual image 600 may have been captured via the visual imaging system of vehicle 404 of FIG. 4. That is, terrestrial-view visual image 600 may be a real-time and/or a drive-time terrestrial-view visual image. Terrestrial-view visual image 600 includes street-level perspective visual representations of at least drivable surfaces 604 (e.g., a road), non-drivable surfaces 606 (e.g., sidewalks), various buildings 610, a lane diver 612 in road 604, a pedestrian 616, a traffic signal posit 618, and a curb 620. FIG. 6B illustrates an exemplary aerial-view visual image 630 generated by inverse perspective mapping performed on the terrestrial-view visual image 600 of FIG. 6A. For example, at least one of inverse perspective mapper 146 of SME 140 or inverse perspective mapper 170 of LE 160 may rotate the street-level perspective of terrestrial-view visual image 600 to an aerial perspective to generate aerial-view visual image 630. As such, aerial-view visual image 630 may be a real-time and/or a drive-time aerial-view visual image. As shown in FIG. 6B, aerial-view visual image 630 includes aerial-view perspective visual representations of at least drivable surfaces 604, non-drivable surfaces 606, various buildings 610, the lane diver 612 in road 604, the pedestrian 616, the traffic signal posit 618, and the curb 620. That is, inverse perspective mapper 170 may perform an inverse perspective mapping of terrestrial-view visual image 600, via one or more geometric transformations of the pixels of terrestrial-view visual image 600, and generate aerial-view visual image 630. Note that in the perspective-transformed aerial-view visual image 630, the area of 2D aerial view of the surface is limited via a field-of-view (FOV) of the imaging system of vehicle 404. In various embodiments, pedestrian 616, as well as other dynamic objects, may be removed and/or vetoed from terrestrial-view visual image.

In various embodiments, the geometric transformation is generated by generating one or more assumed transformations within the depth field of terrestrial-view visual image 600. For example, a pair of lines that are assumed to be parallel within the plane of the surface the Earth (or at least parallel to the surface of the Earth) are constructed. As an example, terrestrial-view image 600 includes visual representations of a lane divider 612 and curb 620. A pair of lines may be constructed from these assumed parallel structures (i.e., lane divider 612 and curb 620) that lie within the plane of the surface of the Earth. Points on these parallel structures may be determined. For example, points 622 and 624 are determined on curb 620. Points 622 and 624 form a first line. Points 626 and 628 are determined on lane divider 612. Points 626 and 628 form a second line. The first and second lines lie on the surface of the Earth and are assumed to be at least approximately parallel. Note that due to the distortion of the depth perception within terrestrial-view visual image 600, the first and second lines do not appear parallel. Based on the apparent angle between the first and second lines and other depth perception markings within terrestrial-view visual image, a geometric transformation of points 622, 624, 626, and 628 is determined, such that the first and second lines, generated under the transformation, appear parallel. The determined geometric transformation is then applied to the pixels in terrestrial-view visual 600 to generate the pixels of aerial-view visual image 630. Note that the geometrically transformed points 622, 624, 626, and 628 generate a first and a second line that appear parallel in aerial-view visual image 630 of FIG. 6B. A neutral network included in inverse perspective mapper 170 may be trained to determine points 622, 624, 626, and 628 (in terrestrial-view visual image 600), and generate the geometric transformation such that the lines generated via the transformed points 622, 624, 626, and 628 (in aerial-view visual image 630) appear parallel. The inherent field-of-view (FOV) 638 of the imaging system that captured terrestrial-view visual image 600 is shown in FIG. 6B. The position of the vehicle 602 is indicated in FIG. 6B. Note that from the position of vehicle 602 in FIG. 5B as well as aspects of the optics of vehicle's 606 imaging system, the relative positions of tangible objects (e.g., roads 606 and sidewalks 606), with respect to vehicle 602, may be determined. In other embodiments, a 3D reconstruction of the environment may be generated, In at least one non-limiting embodiment, the 3D reconstruction may be generated via a CNN. In other embodiments, the 3D reconstruction may be generated via other means. Once, generated, the 3D reconstruction may be rotated to generate the inverse perspective mapping. The 3D reconstruction may be rotated (i.e., an inverse perspective mapping may be performed) via a CNN or other means.

Figure 6C:
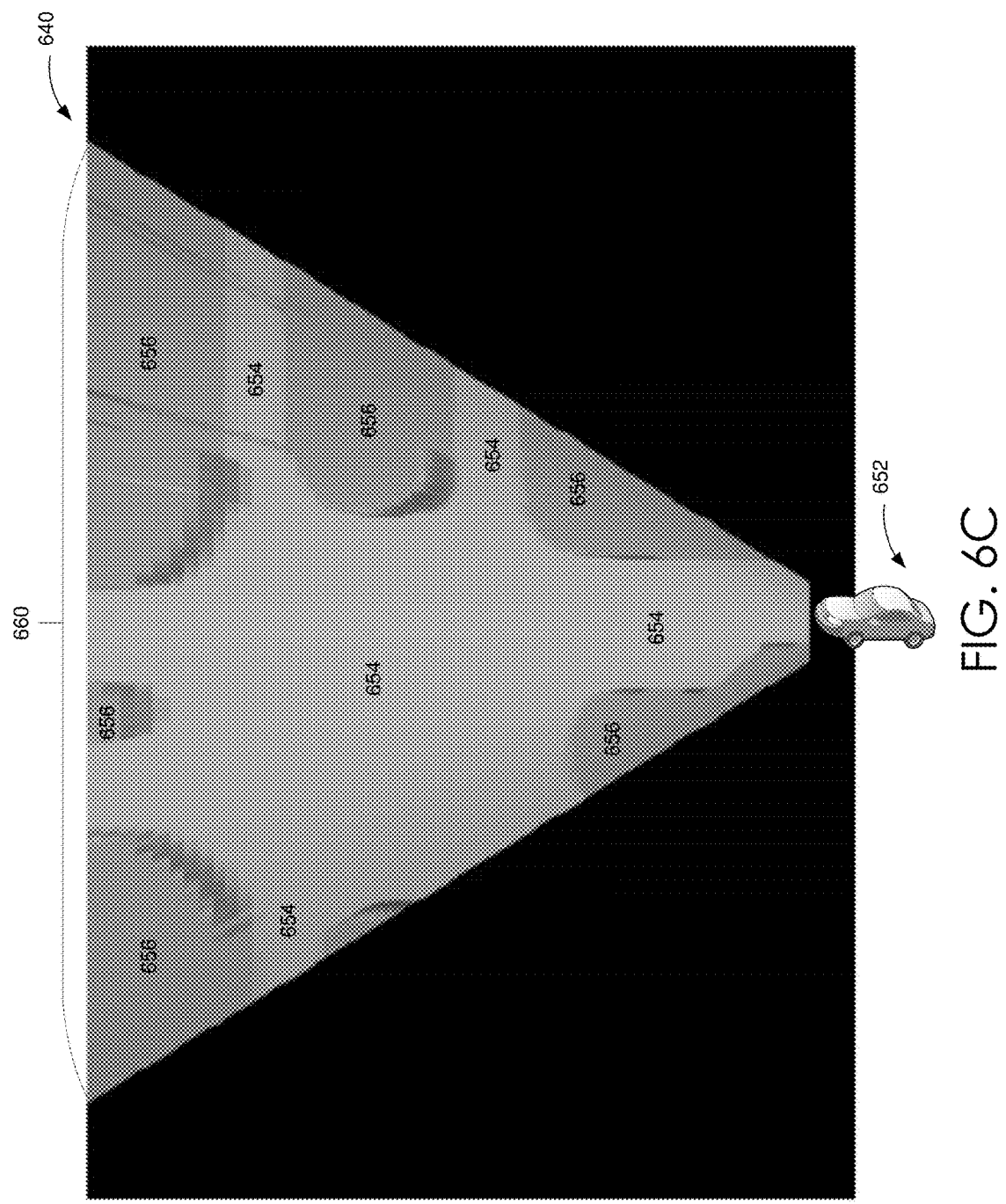
FIG. 6C illustrates another exemplary drive-time aerial-view semantic image generated by image perspective mapping a drive-time terrestrial-view semantic image that is consistent with the various embodiments.

FIG. 6C illustrates another exemplary drive-time aerial-view semantic image 640 generated by image perspective mapping performed on a drive-time terrestrial-view semantic image that is consistent with the various embodiments. In some embodiments, visual image semantic segmenter 168 may semantically segmented a real-time and/or a drive-time terrestrial-view visual image to generate an aerial-view semantic image 640. As such, aerial-view semantic image 640 may be a real-time and/or a drive-time aerial-view semantic image. Drive-time aerial-view semantic image 640 shows semantic representations of roads (or drivable surface) 654, and various sidewalks (or non-drivable surfaces) 656. The semantic representations indicate semantic labels of the objects within vehicle's 652 environment, via color (or greyscale) coding of the corresponding semantically-labeled regions of features. Based on the position of vehicle 652 and aspects of the optics included in the imaging system of vehicle 652, the relative positions of the objects (e.g., roads 654 and sidewalks 656), with respect to vehicle 652, are indicated in the semantic representations of the objects. Inverse perspective mapper 170 may perform an inverse perspective mapping on a terrestrial-view semantic image to generate aerial-view semantic image 640. In other embodiments, inverse perspective mapper 170 may perform an inverse perspective mapping on the terrestrial-view visual image to generate a aerial-view visual image. In such embodiments, visual image sematic segmenter 168 semantically segments the resulting aerial-view visual image to generate aerial-view semantic image 640. Note that the 2D field of aerial-view semantic image 640 is limited view the FOV 660 of the imaging system that took the corresponding terrestrial-view visual image.

Upon the generation of the semantic labels and the transformed perspective to aerial-view semantic image 640, both the aerial-view semantic map received via semantic map requester/receiver 164 and the real-time and/or drive-time aerial-view semantic image 640 are 2D images with a similar aerial-view perspective and in the semantic domain. As such, the semantic map and the drive-time image 640 may be registered. For example, aerial-view semantic map 300 of FIG. 3A may be registered with drive-time aerial-view semantic image 640 of FIG. 6C. Semantic image/map register 172 is generally responsible for registering the aerial-view semantic map and the drive-time aerial-view semantic image of vehicle's 104 environment. Semantic image/map register 172 may employ various image registration methods to correlate the semantic features in the aerial-view semantic map to corresponding semantic features in the drive-time aerial-view semantic images and align the map and images based on the correlated features. As discussed, the spatial-alignment of the aerial-view semantic map and the drive-time aerial-view semantic images is performed in the semantic-domain.

Figure 7:
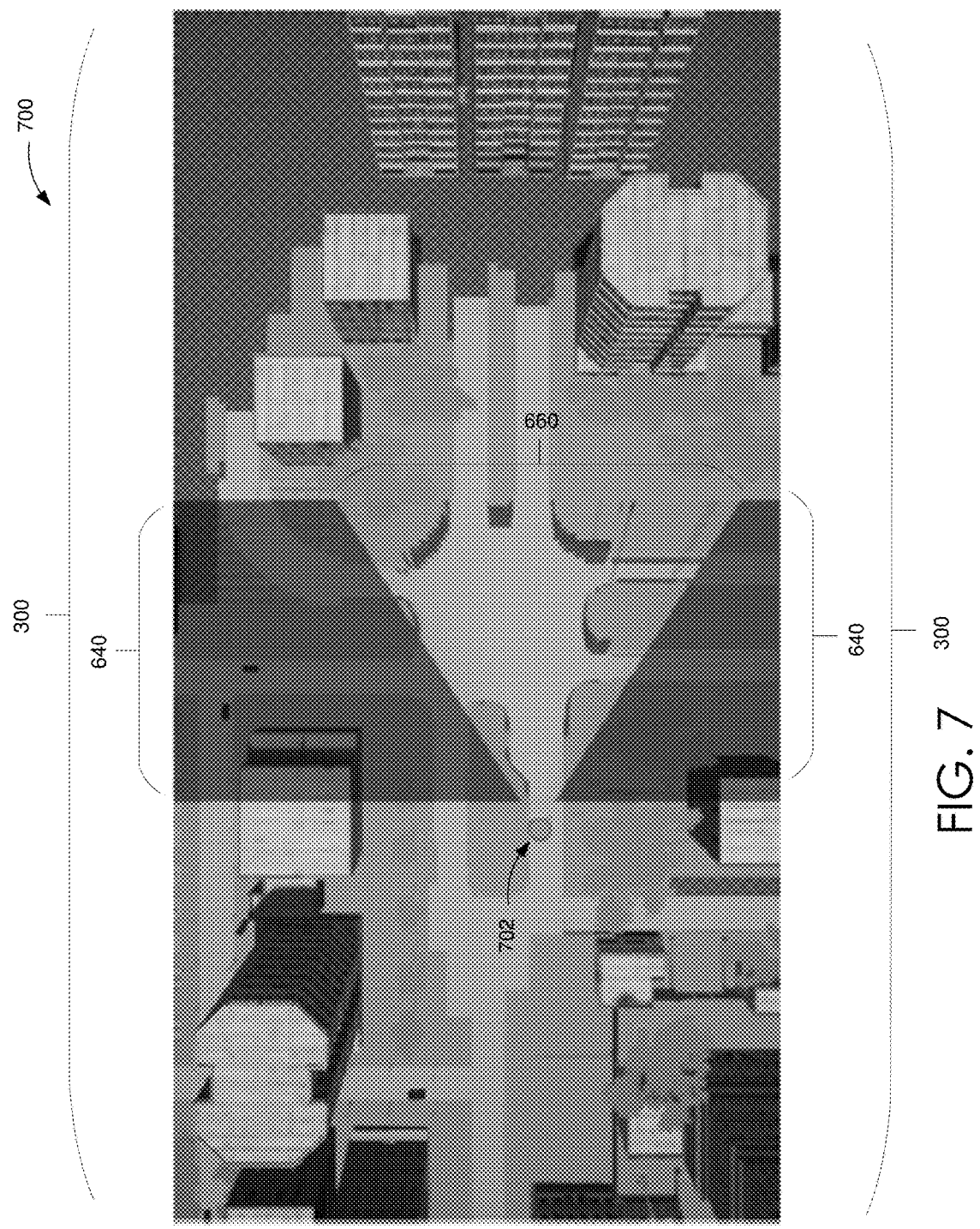
FIG. 7 illustrates a registration of the aerial-view semantic map of FIG. 3A with the drive-time aerial-view semantic image of FIG. 6C.

FIG. 7 illustrates a registration 700 of the aerial-view semantic map 300 of FIG. 3A and the drive-time aerial-view semantic image 640 of FIG. 6C. In various embodiments, semantic image/map register 172 may perform the semantic feature correlation and spatial alignment of aerial-view semantic map 300 and drive-time aerial-view semantic image 640, as shown in FIG. 7. That is, the semantic image/map register 172 may generate a spatial and/or rotational correspondence between the semantic representations in aerial-view semantic map 300 (which indicate absolute positions of the objects) and the semantic representations of drive-time aerial-view image 640 (which indicate relative positions of the objects). In some embodiments, the semantic image/map register 172 may generate a spatial and/or rotational correspondence between the absolute positions of the objects (indicated in aerial-view semantic map 300) and the relative positions of the objects (indicated drive-time serial-view semantic image 640). Note that in the image registration 700 shown in FIG. 7, the drive-time aerial-view semantic image 640 is overlayed on top of the aerial-view semantic map 300, such that the semantic features depicted in the aerial-view semantic map 300 and the drive-time aerial-view semantic image 640 are in spatial alignment. The spatial pixel resolution of at least one of the aerial-view semantic map 300 and the drive-time aerial-view semantic image 640 may have been upsampled and/or downsampled to enable the spatial alignment of the semantic-label encoding pixels of the aerial-view semantic map 300 and the drive-time aerial-view semantic image 640. In various embodiments, semantic image/map register 172 may employ one or more edge detectors and/or boundary detectors to detect various edges and/or boundaries of the semantic features in the semantic maps and drive-time semantic images and align the semantic maps and drive-time semantic images based on the detected edges and/or boundaries. Note, as shown in FIG. 7, the various semantic concepts (drivable surfaces and non-drivable surfaces) of aerial-view semantic map 300 and drive-time aerial-view semantic image are spatially aligned and/or overlayed. FIG. 7 shows the FOV 660 of vehicle's 702 optical system. As discussed above, transforming the visual-domain into the semantic-domain (for both maps and images) enables dense semantic registration (i.e., the employment of all or at least most pixels) methods that decrease the per pixel difference (i.e. cost function) in order to align drive-time image with the map. Note that the dense image registration methods discussed herein are contrasted to conventional image registration methods. Conventional image registration may employ only a small subset of pixels that are associated with various visual features (e.g., edges) in the visual images. Some embodiments may employ a deep CNN to align those images Referring back to FIG. 1, fine localizer 174 is generally responsible for determining the fine localization of vehicle 104 and/or vehicle 702 based on the image registration of the aerial-view semantic map and the drive-time aerial-view semantic image. In various embodiments, fine localizer 174 determines the absolute location of vehicle 702 based on the spatial and/or rotational correspondence (generated via image registration) of the semantic representations (or semantic features) of aerial-view semantic map 300 and drive-time aerial-view semantic image 640. In at least one embodiment, the absolute position of vehicle 702 is determined based on the spatial and/or rotational correspondence (generated via image registration) between the absolute positions of objects indicated in the semantic representations (or semantic features) of aerial-view semantic map 300 and the relative positions of objected indicated in the semantic representations (or semantic features) drive-time aerial-view semantic image 640. The absolute orientation of t vehicle 702 may be determined via at least these rotations correspondences.

That is, fine localizer 174 determines a more accurate and precise location/position and/or orientation of vehicle 104, as compared to the course localizer 162. Final localizer 174 may associate the coordinate system of the semantic map with the semantic image based on the image registration performed by semantic image/map register 172. More specifically, fine localizer 174 may integrate the image registration into a vehicle navigation/localization context. Fine localizer 174 may employ information of the field-of-view (FOV) of the imaging system embedded in vehicle 104 to accurately and precisely determine the location/positon, as well as the orientation, of vehicle 104 based on the correlation of the semantic concepts depicted in the registered semantic map and the semantic image. FIG. 7 shows the finely localized vehicle 702 via the image registration. LE 160 may provide the drive-time localization to a computing device, such as but not limited to navigation computing device 106.

Generalized Processes for Object Localization Within a Semantic Domain

Figure 9A:
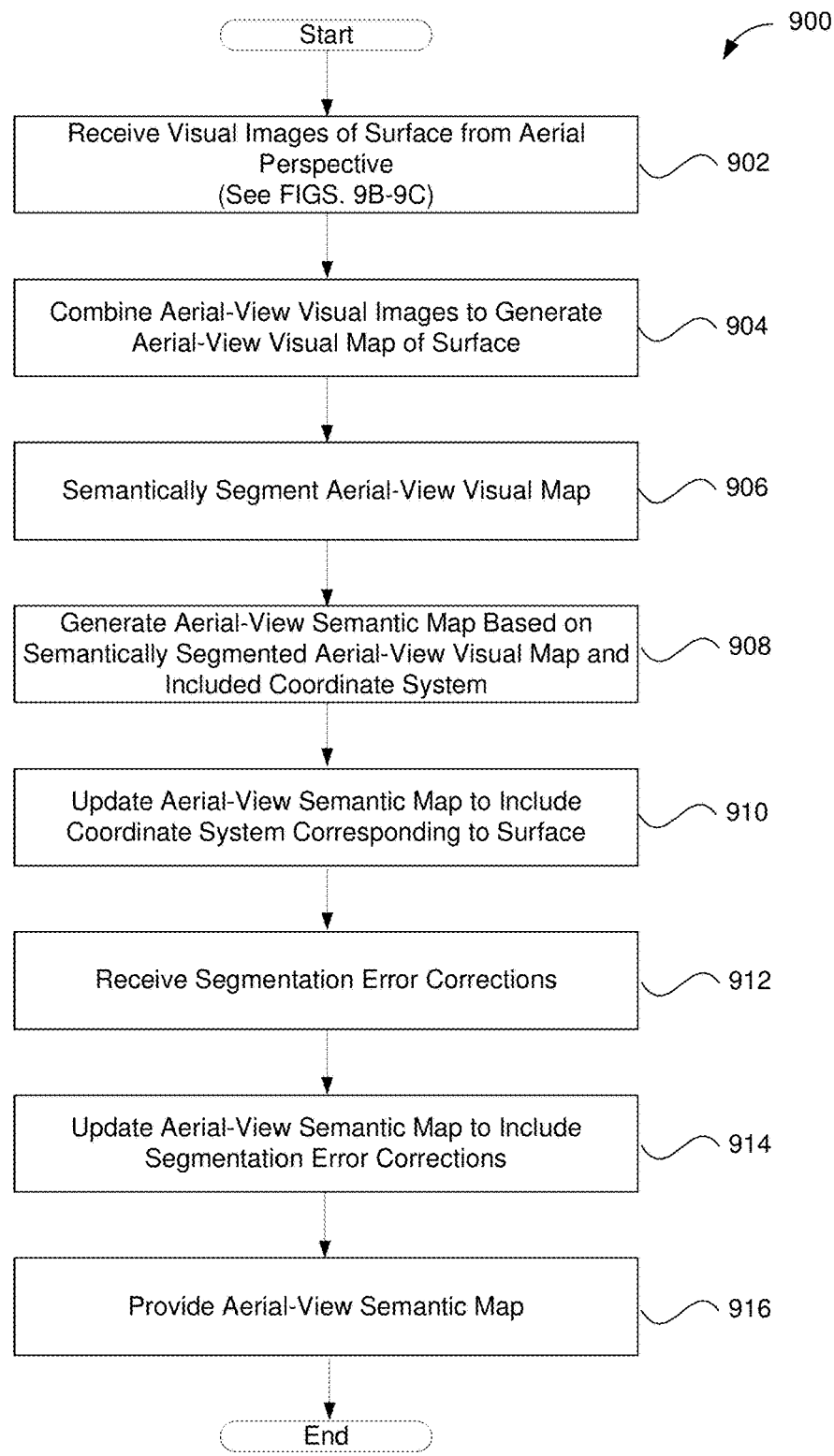
FIG. 9A illustrates one embodiment of an enhanced process flow for generating an aerial-view semantic map that is consistent with the various embodiments presented herein.
Figure 9B:
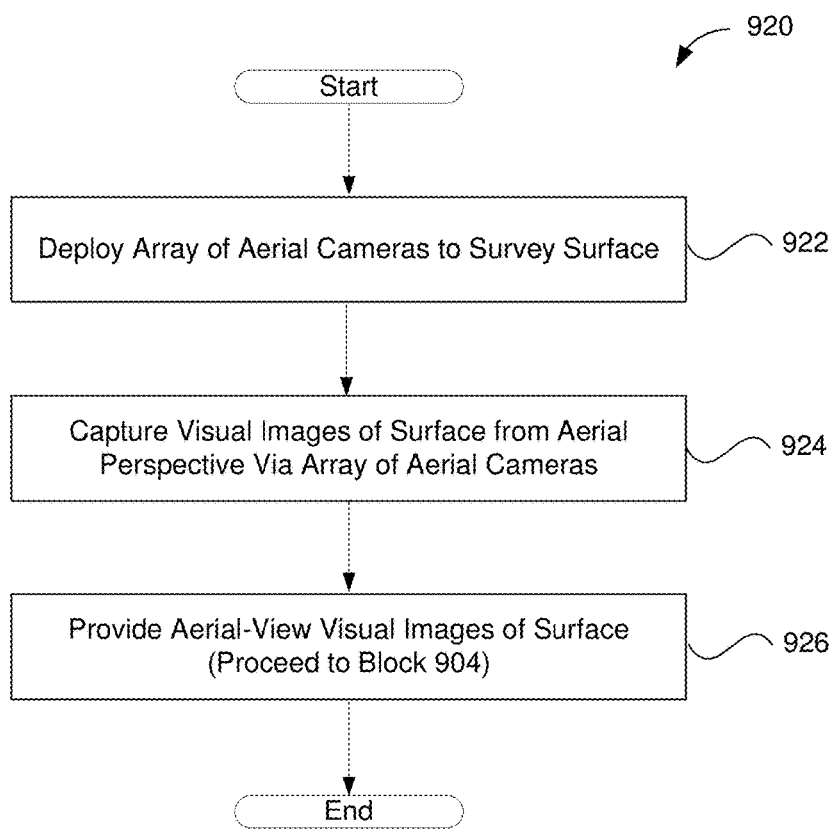
FIG. 9B illustrates one embodiment of an enhanced process flow for capturing aerial-view visual images that may be employed to generate the aerial-view semantic map of FIG. 9A.
Figure 9C:
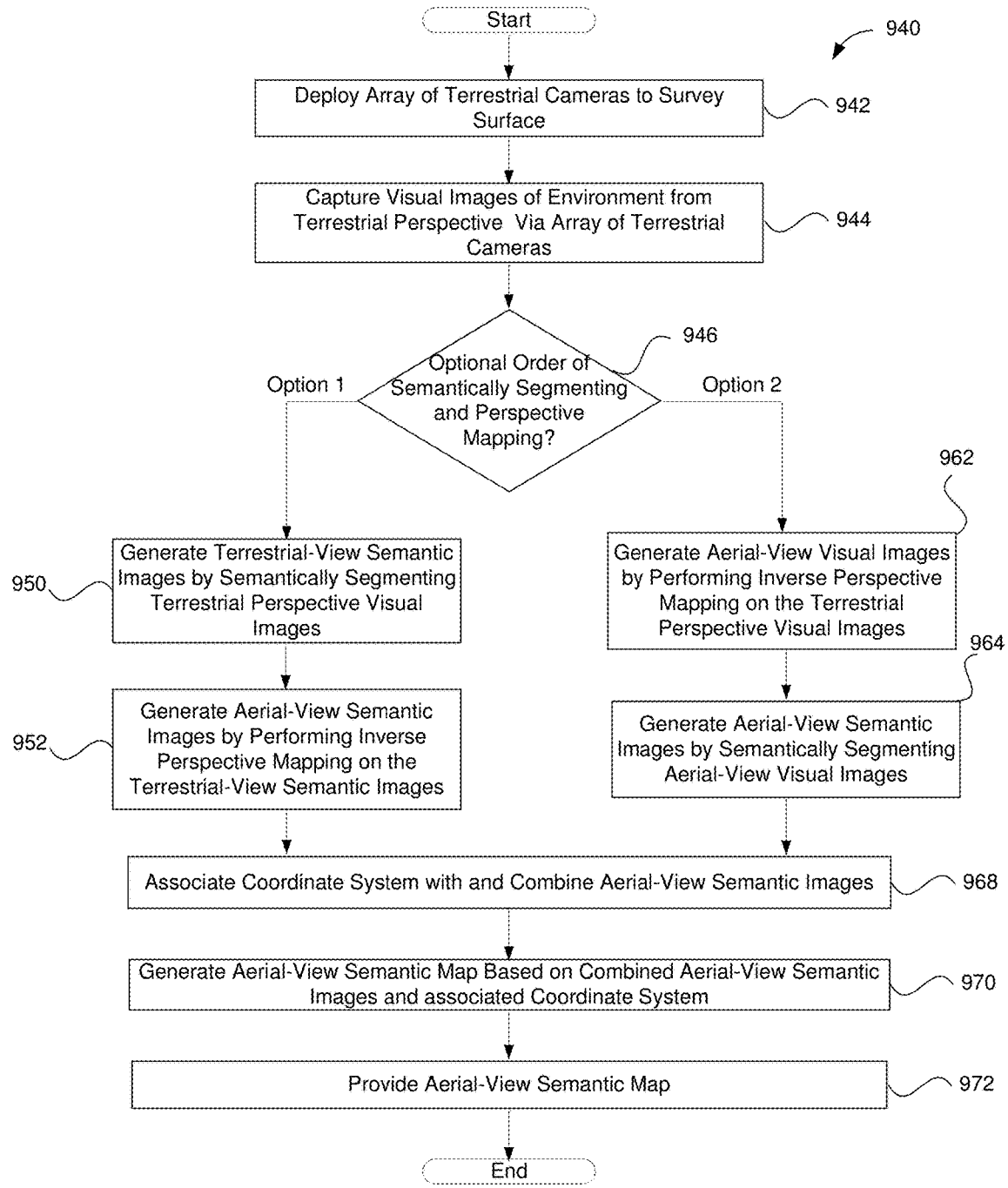
FIG. 9C illustrates another embodiment of an enhanced process flow for generating an aerial-view semantic map that is consistent with the various embodiments presented herein.
Figure 10A:
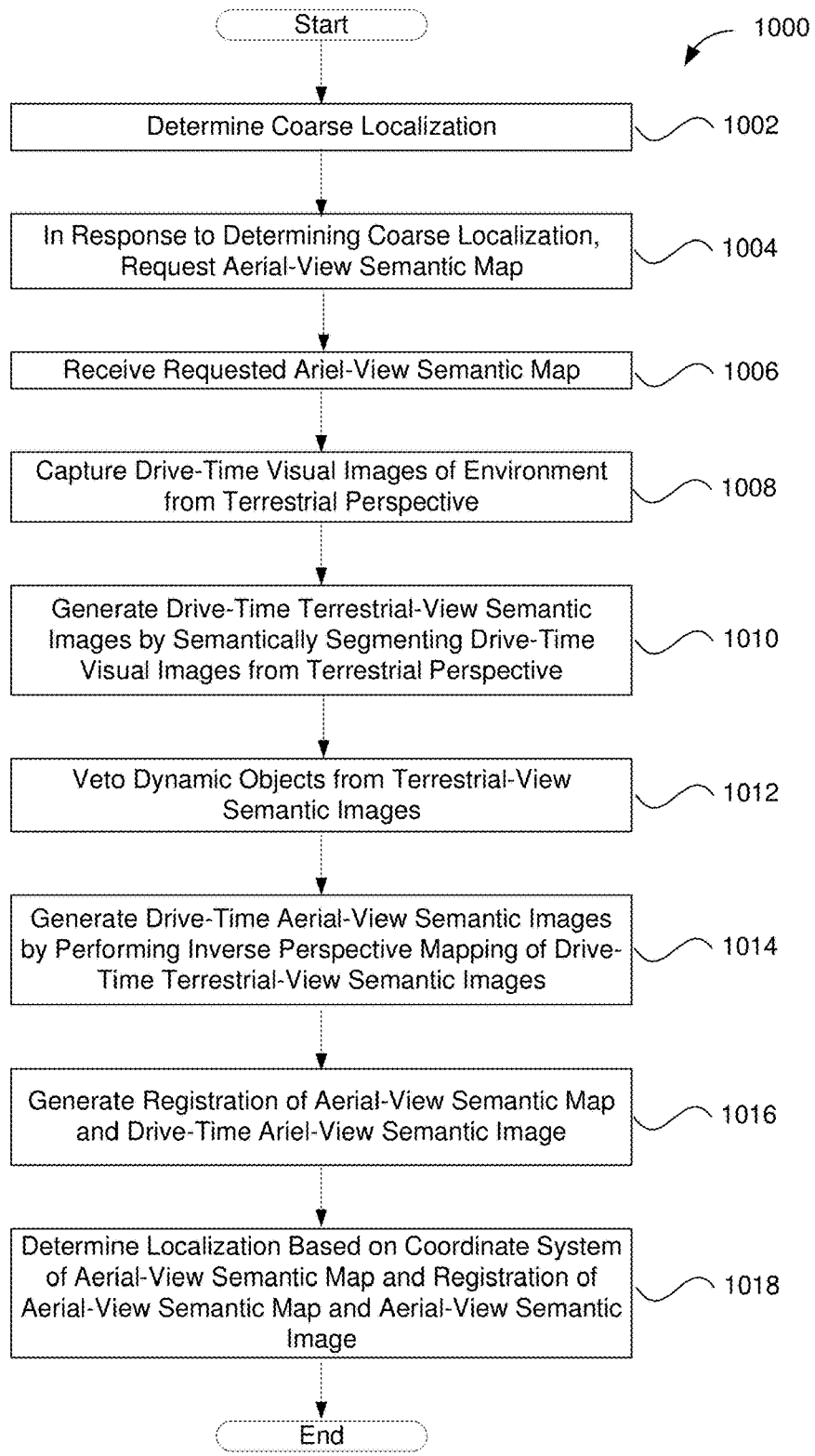
FIG. 10A illustrates one embodiment of an enhanced process flow for localizing an object in a semantic domain that is consistent with the various embodiments presented herein.
Figure 10B:
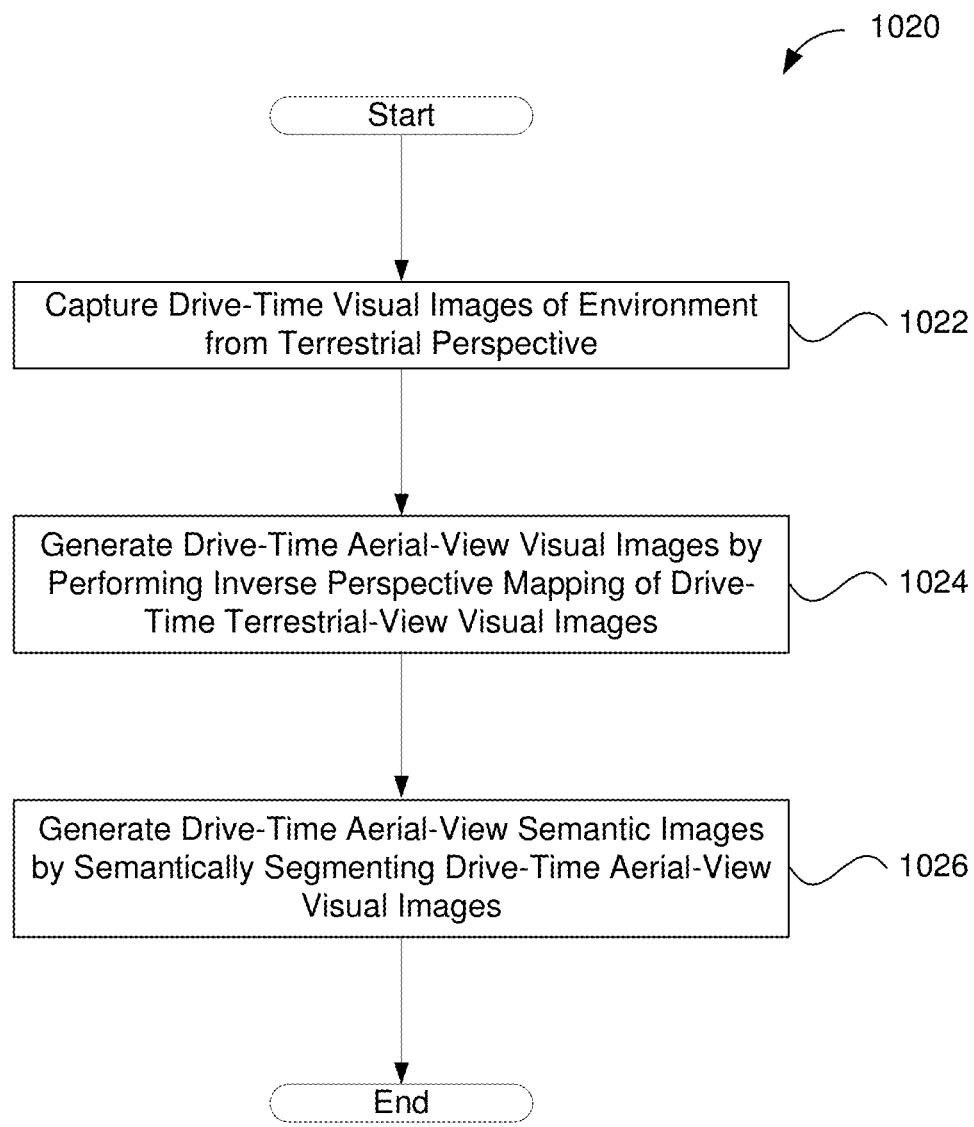
FIG. 10B illustrates an alternative embodiment of an enhanced process flow for localizing an object in a semantic domain that is consistent with the various embodiments presented herein.
Figure 11:
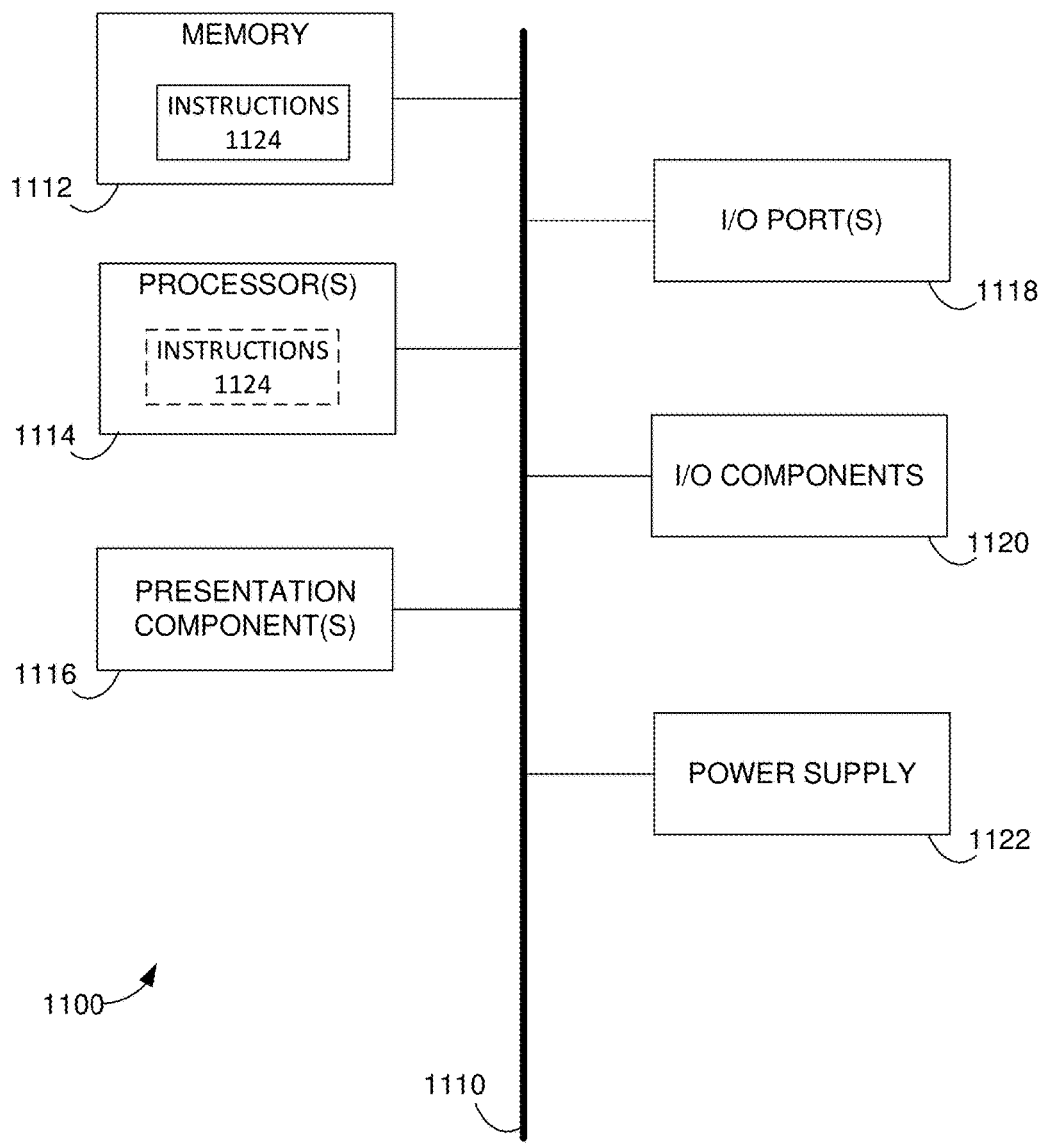
FIG. 11 is a block diagram of an example computing device in which embodiments of the present disclosure may be employed.

Processes 800-1020 of FIGS. 8A-10B, or portions thereof, may be performed and/or executed by any computing device, such as but not limited to computing devices 102, 106, and 108 of FIG. 1, as well as computing device 1100 of FIG. 11. Additionally, a semantic map engine (SME) application, such as but not limited to enhanced SME 140 of FIG. 1 may perform and/or execute at least portions of processes 800-1020. A localization engine (LE) application, such as but not limited to enhanced LE 160 of FIG. 1 may perform and/or execute at least portions of processes 800-1020.

Figure 8A:
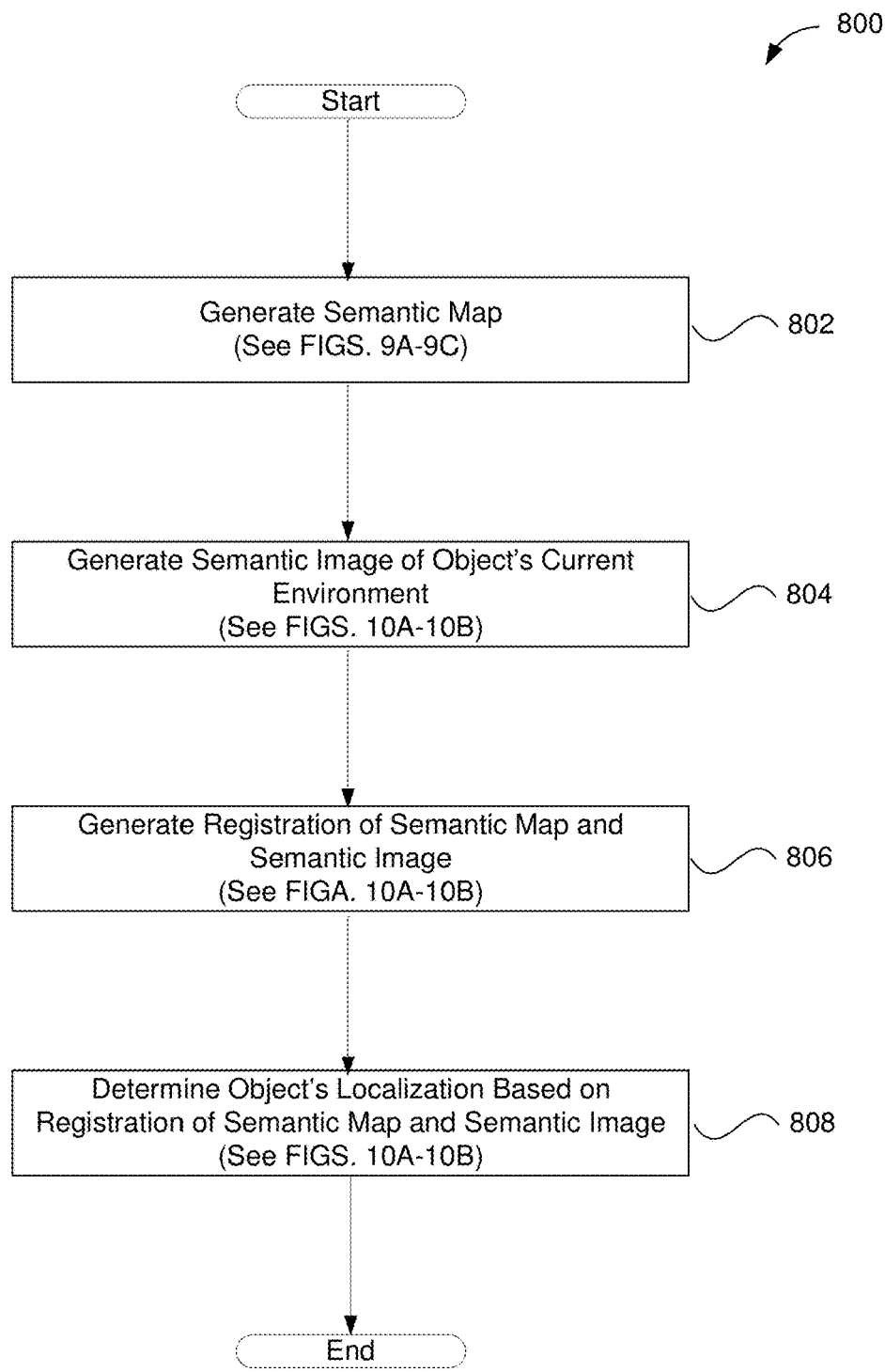
FIG. 8A illustrates one embodiment of an enhanced process flow for localizing an object in a semantic domain that is consistent with the various embodiments presented herein.

FIG. 8A illustrates one embodiment of an enhanced process flow for localizing an object in a semantic domain that is consistent with the various embodiments presented herein. In various embodiments, process 800 may be performed by a semantic map engine, such as SME 140, and a localization engine, such as LE 160 of FIG. 1. Initially, as indicated by block 802, a semantic map is generated using visual images of a surface. As described above, the visual images may be provided by one or more of mobile-imaging service providers 120. The semantic map is generated by semantically segmenting the visual images, by for example, SME 140 of FIG. 1. Various ways of generating a semantic map are discussed below with reference to FIGS. 9A-C. The semantic map may be a 2D aerial-view semantic map, as discussed throughout. For example, aerial-view semantic map 300 of FIG. 3 may be generated at block 802.

At block 804, a semantic image of the current environment of an object (e.g., a vehicle) is generated from drive-time (or real-time) visual images of a current environment captured by an object's (e.g., vehicle's) imaging system. As described above with reference to LE 160 of FIG. 1, the drive-time visual images are semantically segmented to generate semantic image of the current environment of the object. The semantic image may be generated by LE 160 of FIG. 1. Various processes of generating a semantic image of an object's current environment are described below in reference to FIG. 10A-B. In various embodiments, the drive-time semantic images may be 2D aerial-view semantic images of the vehicle's drive-time environment. For example, drive-time aerial-view semantic image 640 of FIG. 6C may be generated at block 804.

Referring to block 806, a registration of the semantic map and the semantic image is generated. The registration may be performed by image/map register 172, as described above in reference to FIG. 1. The registration is generated based on correlating semantic features encoded in the semantic map and corresponding semantic features encoded in the semantic image. At block 808, localization of the object is determined based on the registration of the semantic map and the semantic image. The registration and a coordinate system associated with the semantic map enable a precise and accurate determination of both the object's position and orientation on the surface. The localization of the vehicle, in block 808, may be determined by fine localizer 174 of the LE 160 of FIG. 1. For example, image registration 700 of aerial-view semantic map 300 and drive-time aerial-view semantic image 640, as shown in FIG. 7, may be performed at block 806. Various embodiments of registering a semantic map and a semantic image are discussed, at least in conjunction with processes 1000 and 1020 of FIGS. 10A-10B.

Figure 8B:
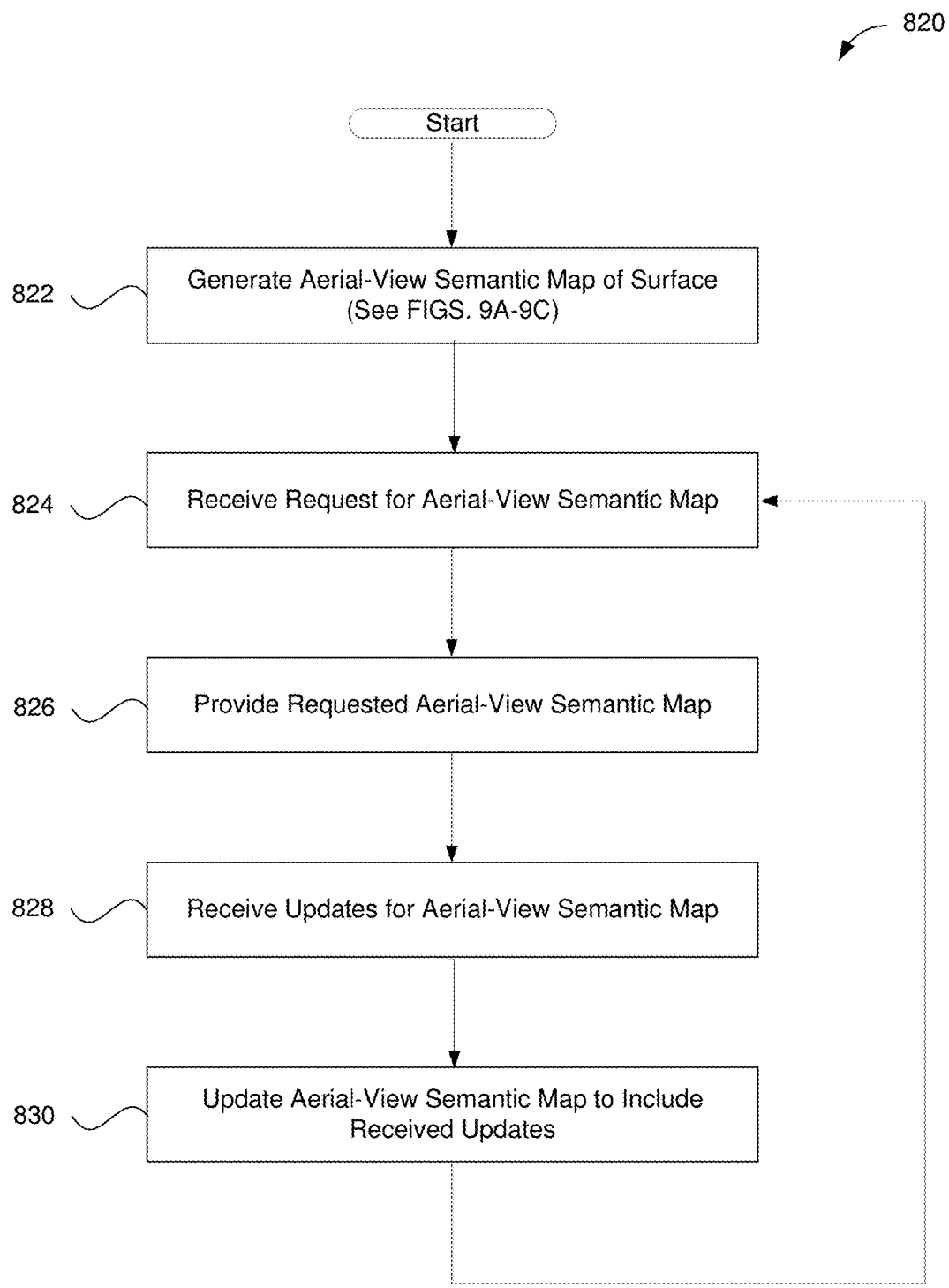
FIG. 8B illustrates one embodiment of an enhanced process flow for providing an aerial-view semantic map to localize and object that is consistent with the various embodiments presented herein.

FIG. 8B illustrates one embodiment of an enhanced process flow for providing an aerial-view semantic map to localize an object that is consistent with the various embodiments presented herein. In some embodiments, an aerial-view semantic map, such as but not limited to 2D aerial-view semantic map 350 of FIG. 3B, may be generated and provided by a semantic map engine, such as SME 140 of FIG. 1. Process 820 begins, at block 822 with generating an aerial-view semantic map of a surface, e.g., semantic map 350. At block 824, a request for at least a portion of the aerial-view semantic map is received. The request may be made by any of computing devices 102, 106, and 108, or one of mobile-imaging service providers 120. For example, the portion of the semantic map may be requested by a semantic map requester/receiver, such as but not limited to semantic map requester/receiver 164 of FIG. 1. The requested portion of the semantic map may correspond to a coarse localization of a vehicle, or other object, such as but not limited to a coarse localization, as determined via coarse localizer 162 of FIG. 1. The request may be received by a semantic map provider, such as but not limited to semantic map provider 152 of FIG. 1. Referring to block 826, the semantic map engine sends the requested portion of aerial-view semantic map to the requesting system. The semantic map provider 152 may provide the requested portion of the semantic map. The requested portion of the semantic map may be provided to semantic map requester/receiver 164.

At block 828, semantic map engine receives updates for the aerial-view semantic map. As described above, the semantic map engine may receive updated visual images as the drivable areas of the surface change over time. The updates may be received via any of computing devices 102, 106, or 108, a user or from one of mobile-imagine service providers 120. Block 828 may be similar to block 912 of FIG. 9A. Finally, at block 830, the aerial-view semantic image is updated. In some embodiments, semantic map updater 150 of FIG. 1 may update the generated aerial-view semantic map based on the updated images received. In some other embodiments, a user may manually update and/or edit the aerial-view semantic map. The user may update and/or edit segmenting errors in the aerial-view semantic map as well. The process 820 may be repeated periodically, as more updates become available. It should be noted that process 820 may be an optional process. In some embodiments, the semantic map updates of process 820 may be performed via in a separate process. For instance, the map updates may be created by a special surveying vehicle that only does the updates and may not need to have current portion of the map for localization.

FIG. 9A illustrates one embodiment of an enhanced process flow for generating an aerial-view semantic map that is consistent with the various embodiments presented herein. In some embodiments, the process 900 may be performed by a semantic map engine, such as SME 140 of FIG. 1. At block 902, visual images of surface (of the Earth) from an aerial perspective are received by an SME. Next, at block 904, the visual images are combined (and/or stitched together) to generate an aerial-view visual map of the surface. As discussed above, in some embodiments, visual image processor 142 of FIG. 1 may be used to combine (or stitch together) multiple visual images to generate a larger view of the surface, one larger than a single aerial-view image could encode. One or more digital image processing techniques and/or methods may be applied on the visual images to combine the images to generate an aerial-view visual map of the surface. Further, at block 906, the aerial-view visual map is semantically segmented. As discussed above, the semantic segmenting generates the correspondence between regions on the map (i.e., the pixels) and the various semantic concepts or labels indicating the tangible objects on the surface. In some embodiments, the semantic segmentation of an aerial-view visual map is performed via a deep learned neural network, such as, but not limited to, a deep convolutional neural network (CNN). At block 908, a 2D aerial-view sematic map is generated based on the semantically segmented aerial-view visual map and a coordinate system. A corresponding semantic map may be generated by associating a semantic label (or class) to each pixel in the aerial-view visual map. The pixels of the corresponding semantic map encode the associated semantic label. Additionally, each pixel of a map is associated with one or more coordinates of the coordinate system, wherein the associated coordinates uniquely indicate a spatial location or position.

Next, at block 910, the aerial-view semantic map is updated to include a coordinate system corresponding to the surface. The coordinate system is to provide a one-to-one mapping or correspondence between coordinates (or the coordinate system) and locations on a surface (e.g., the Earth's surface). Each unique set of coordinates of the coordinate system uniquely indicates a unique location on the surface. The coordinate system may be a global geographic coordinate system that enables each point on the surface to be uniquely characterized via at least two real scalars. Further, at block 912, segmentation error corrections are received. As described above, the semantic map engine may receive updated visual images, including segmentation error corrections, as the drivable areas of the surface change over time. The updates may be received via any of computing devices 102, 106, or 108, a user or from one of mobile-imagine service providers 120. A user may manually update and/or edit segmenting errors as well. For example, block 912 may be similar to block 828 of FIG. 8B. In one example, in response to receiving such errors is to employ humans to manually correct the errors. Another embodiment includes employing drive-time updates from the vehicle, when numerous vehicles observe the same part of the surface and thus enabling the ability to probabilistically interpret the semantic region. For example, if the map has a particular point labeled as a sidewalk but the majority of the user vehicles have detected that point as a drivable surface, than it may be determined, to a high degree of probability or likelihood that the environment has changed (or that our prior map was erroneous). The map may be updated with the mostly-likely correct semantic label.

At block 914, the aerial-view semantic map is updated with segmentation error corrections. The aerial-view semantic map is updated using the received updated images containing segmentation error corrections. In some embodiments, a user may manually update and/or edit the semantic map (via a client device, such as client device 108). At block 914, the aerial-view semantic map is provided to a database storing the maps and/or a computing device requesting such map.

FIG. 9B illustrates one embodiment of an enhanced process flow for capturing aerial-view visual images that may be employed to generate the aerial-view semantic map of FIG. 9A. At block 922, an array of aerial cameras are deployed to survey the surface (of the Earth). The aerial cameras may be deployed on a fleet of mobile-imagining service providers 120 of FIG. 1, such as, but not limited to, unmanned aerial vehicle (UAV) 124 (e.g., a drone), Earth-orbiting satellite 126, and airplane 128. The service providers 120 may include imaging systems that may include any combination of one or more visual image cameras. The cameras are capable of generating visual images; these include, but are not limited to, cameras that detect visual wavelengths, infrared (IR) cameras, ultraviolet (UV) cameras, radio-frequency (RF) detectors, microwave detectors, and the like. Such cameras may include light detection and ranging (LIDAR) cameras, time-of-flight (TOF) cameras, or other laser-scanning-based cameras. Other cameras that generate visual images may include stereoscopic cameras, 3D cameras, and the like. Further, at block 924, the array of aerial cameras capture visual images of the surface (of the Earth) from an aerial perspective. And, at block 926, the aerial-view visual images captured are provided to generate the aerial-view semantic map of FIG. 9A.

FIG. 9C illustrates another embodiment of an enhanced process flow for generating an aerial-view semantic map that is consistent with the various embodiments presented herein. Process 940 starts at block 942 with deploying an array of terrestrial cameras to survey the surface (of the Earth). The terrestrial cameras may be deployed upon autonomous or semi-autonomous land vehicles, such as but not limited to mobile-imaging service provider 120, autonomous vehicle 122 of FIG. 1. At block 944, visual images from a terrestrial perspective are captured via the terrestrial cameras. Decision block 946 provides two separate alternatives (i.e., options) in the generation of an aerial-view semantic map. In option 1, as shown in the left-hand column of process 940, and at block 950, terrestrial-view semantic images are generated by semantically segmenting the terrestrial perspective visual images. As discussed above, the semantic segmenting generates correspondence between regions on the image (i.e., the pixels) and the various semantic concepts or labels indicating the tangible objects on the surface/environment. In some embodiments, the semantic segmentation of an image is performed via a deep learned neural network, such as, but not limited to, a deep convolutional neural network (CNN), such as a CNN included in visual image semantic segmenter 144 of FIG. 1. Corresponding terrestrial-view semantic images may be generated by associating a semantic label (or class) to each pixel in the corresponding terrestrial perspective visual images. At block 952, an inverse perspective mapping is performed on the terrestrial-view semantic images to generate corresponding aerial-view semantic images. As described above, geometric transformations of the ordering of the pixels in the terrestrial-view semantic images are performed to generate the transformation (or rotation) in perspective from a street-level perspective to an aerial-view perspective. In some embodiments, an inverse perspective mapper, such as but not limited to, inverse perspective mapper 146 may be employed to generate the transformation from the terrestrial-view perspective to the aerial or bird's-eye perspective.

In accordance with option 2, as shown in the right-hand column of process 940, and to generate aerial-view semantic images, at block 962, inverse perspective mapping is performed on the terrestrial perspective visual images to generate corresponding aerial-view visual images. The inverse perspective mapping may be performed via inverse perspective mapper 146. Next, at block 964, the aerial-view semantic images are generated by semantically segmenting the resulting aerial-view visual images. The segmenting can be performed by a visual image semantic segmenter, such as but not limited to, visual image semantic segmenter 144 of FIG. 1.

Option 1 and option 2 merge at block 968, where a coordinate system is associated with the aerial-view semantic images generated in block 952 and 964. The aerial-view semantic images are combined together. As discussed above, in some embodiments, visual image processor 142 of FIG. 1 may be used to combine multiple aerial-view semantic images to generate a larger view of the surface, one larger than a single aerial-view semantic image could encode. One or more digital image processing techniques and/or methods may be applied on the aerial-view semantic images to combine the images to generate an aerial-view semantic map of the surface. At block 970, an aerial-view semantic map is generated based on the combined aerial-view semantic images and the associated coordinate system. As discussed above, the coordinate system is to provide a one-to-one mapping or correspondence between coordinates (or the coordinate system) and locations on a surface (e.g., the Earth's surface). Each unique set of coordinates of the coordinate system uniquely indicates a unique location of the surface. The coordinate system may be a global geographic coordinate system that enables each point on the surface to be uniquely characterized via at least two real scalars. Finally, at block 972, the generated aerial-view semantic map may be provided to a database storing maps, and if requested, to an object to be localized.

FIG. 10A illustrates one embodiment of an enhanced process flow for localizing an object (e.g., vehicle) in a semantic domain that is consistent with the various embodiments presented herein. Process 1000 may be performed by a localization engine, such as LE 160 of FIG. 1. At block 1002, a coarse location of an object (e.g., a vehicle) is determined. The coarse localization may be determined by a coarse localizer 162 of FIG. 1. A coarse localization may be determined using Global Navigation Satellite Systems (GNSSs), such as the Global Positioning System (GPS), Galileo, and GLONASS embedded in the object. At block 1004, at least a portion of an aerial-view semantic map is requested in response to and based on the determined coarse localization. As discussed above, the aerial-view semantic map may include and/or be associated with a coordinate system. The aerial-view semantic map may be requested based on matching the coarse localization of the object with the coordinate system of the aerial-view semantic map. The aerial-view semantic map may be one generated by process described in reference to FIGS. 9A-C. For example, aerial-view semantic map 300 of FIG. 3A may be requested at block 1004. Further, at block 1006, the requested aerial-view semantic map is received by the localization engine. A semantic map requester/receiver, such as, but not limited to, semantic map requester/receiver 164 of FIG. 1, may request and receive the portion of the semantic map at blocks 1004 and 1006. For instance, aerial-view semantic map 300 may be received by semantic map requester/receiver 164, at block 1006.

Next, at block 1008, drive-time visual images of the environment from a terrestrial perspective are captured by an imaging system of the object, such as but not limited to the imaging systems embedded in vehicle 404 of FIG. 4. For example, the imaging system of vehicle 404 may capture drive-time terrestrial-view visual image 500 of FIG. 5A. The imaging system of an object, such as a vehicle, may include any combination of one or more visual image cameras. Various embodiments of vehicle embedded imaging systems are discussed above in conjunction with at least FIG. 4. At block 1010, the drive-time visual images from terrestrial perspective are semantically segmented to generate corresponding drive-time terrestrial-view semantic images, such as but not limited to drive-time terrestrial-view semantic image 520 of FIG. 5B and/or drive-time terrestrial-view semantic image 540 of FIG. 5C. As discussed above, the semantic segmenting generates correspondence between regions on the image (i.e., the pixels) and the various semantic concepts or labels indicating the tangible objects in the environment. In some embodiments, the semantic segmentation of an image is performed via a deep learned neural network, such as, but not limited to, a deep convolutional neural network (CNN). For example, the semantic segmentation of a terrestrial-view visual image may be performed via a visual image semantic segmenter, such as, but not limited to, visual image semantic segmenter 168 of FIG. 1. Corresponding drive-time terrestrial-view semantic images may be generated by associating a semantic label (or class) to each pixel in the corresponding drive-time visual images from terrestrial perspective.

Further, at block 1012, dynamic objects are vetoed from the terrestrial-view semantic images. The vetoed dynamic objects are removed from the terrestrial-view semantic images. That is, dynamic objects, such as, but not limited to, vehicles, pedestrians, and the like may be vetoed and/or removed from the terrestrial-view semantic images. The removal of dynamic objects from the drive time semantic images is performed because such dynamic objects will not be included in the received semantic map. As such, the performance of the image registration discussed herein is improved by vetoing dynamic objects.

At block 1014, inverse perspective mapping is performed on the drive-time terrestrial-view semantic images to generate corresponding drive-time aerial-view semantic images. An inverse perspective mapper, such as but not limited to inverse perspective mapper 170 of FIG. 1, may be employed to perform the inverse perspective mapping. As described above, in conjunction with inverse perspective mapper 170, geometric transformations of the ordering of the pixels in the drive-time terrestrial-view semantic images are performed to generate the shift in perspective. In some embodiments, a neural network is employed to generate the transformation from terrestrial-view perspective to the aerial or bird's-eye perspective. For instance, drive-time aerial-view semantic image 640 of FIG. 6C may be generated at block 1014. Further, at block 1016, registration of the received aerial-view semantic map and one or more drive-time aerial-view semantic images is determined. A semantic image/map register, such as, but not limited to, semantic image/map register 172 of FIG. 1 may be employed to perform the image registration. As described above, at least in conjunction with semantic image/map register 172, the registration is generated based on correlating semantic features encoded in the aerial-view semantic map and corresponding semantic features encoded in the drive-time aerial-view semantic image. For example, image registration 700 of FIG. 7, of aerial-view semantic map 300 and drive-time aerial-view semantic image 640, may be generated at block 1016. Finally, at block 1018, localization of the object is determined based on coordinate system of the aerial-view semantic map and the registration generated at block 1016. A fine localizer, such as, but not limited to, fine localizer 174 of FIG. 1 may be employed to determine the localization of the object. The coordinate system of the aerial-view map is described in detail in relation to at least FIGS. 9A and 9C. The registration and the coordinate system associated with the aerial-view semantic map enable a precise and accurate determination of both the object's position and orientation on the surface. The localization may be provided and/or indicated via coordinates of the coordinate system and/or an orientation bearing. The localization may be provided in the service of the autonomous operation of a vehicle, such as but not limited to vehicle 104 of FIG. 1.

FIG. 10B illustrates an alternative embodiment of an enhanced process flow for localizing an object (e.g., a vehicle) in a semantic domain that is consistent with the various embodiments presented herein. Process 1020 illustrates an alternative embodiment of an enhanced process flow for generating drive-time aerial-view semantic images of FIG. 10A. At block 1022, drive-time images of environment from terrestrial perspective are generated in similar manner as described in context of block 1008 of FIG. 10A. For example, drive-time terrestrial-view visual image 600 of FIG. 6A may be captured at block 1022, by a real-time imaging system of a vehicle. Next, at block 1024, inverse perspective mapping is performed on the drive-time terrestrial-view images to generate drive-time aerial-view visual images. As described above, geometric transformations of the ordering of the pixels in the drive-time terrestrial-view visual images are performed to generate the shift in perspective. In some embodiments, a neural network is employed to generate the transformation from the terrestrial-view perspective to the aerial or bird's-eye perspective. An inverse perspective mapper, such as, but not limited to, inverse perspective mapper 170 of FIG. 1, may be employed to perform the inverse perspective mapping. For example, inverse perspective mapper 170 may generate real-time aerial-view visual image 630 of FIG. 6B, at block 1024. Further, at block 1026, drive-time aerial-view visual images are semantically segmented to generate corresponding drive-time aerial-view semantic images. As discussed above, the semantic segmenting generates correspondence between regions on the image (i.e., the pixels) and the various semantic concepts or labels indicating the tangible objects in the environment. In some embodiments, the semantic segmentation of an image is performed via a deep learned neural network, such as, but not limited to, a deep convolutional neural network (CNN). Corresponding drive-time aerial-view semantic images may be generated by associating a semantic label (or class) to each pixel in the corresponding drive-time aerial-view visual images. For example, a visual image semantic segmenter, such as, but not limited to, visual image semantic segmenter 168 of FIG. 1, may be employed to semantically segment aerial-view visual image 630 and generate a corresponding aerial-view semantic image. The generated drive-time aerial-view semantic images may then be used to determine localization of the object, as described throughout.

Additional Embodiments for Localizing an Object

Additional and/or alternative embodiments for localizing an object will now be described. These embodiments are consistent with the various embodiments described herein. Note that these embodiments are described in the context of localizing a vehicle. However, it should be understood that other embodiments are not so limited, and other objects may be localized via these and other embodiments. One such embodiment includes a method for localizing a vehicle on a surface of an environment that includes an object that is separate from the vehicle. For example, the object may be a tangible object, such as but not limited to a drivable surface (e.g., a road), a non-drivable surface (e.g., a sidewalk), a tree, a lane divider, a building, or the like. The method includes receiving a first semantic representation of the object. That is, the object may be represented in the semantic domain. More specifically, the first semantic representation of the object may indicate a semantic label associated with the object and an absolute position of the object, with respect to the surface. For example, the first semantic representation of the object may be included in any of the various embodiments of a semantic map discussed herein, such as but not limited to a two-dimensional (2D) aerial-view semantic map of the surface. The absolute position of the object may be indicated via a set of coordinates associated with the semantic map.

The method further captures a visual representation of the object. The visual representation may indicate various detected aspects (e.g., phase, frequency, wavelength, amplitude, intensity, polarization, and the like) of photons and/or EM received from the object (e.g., reflected and/or emitted by the object). That is, a representation of the object may be captured and/or generated in the visual-domain. For example, an imaging system included on the vehicle may capture a visual image (e.g., a drive-time terrestrial-view visual image) of the environment that includes the visual representation of the object.

A second semantic representation of the image may be generated based on a semantic segmentation of the visual representation of the object. In some embodiments, to generate the second semantic representation of the object (i.e., another representation of the object in the semantic-domain), the visual image may be semantically segmented, consistent with the various embodiments discussed herein. The second semantic representation of the object includes the semantic label associated with the object and a relative position of the object. The relative position of the object may be with respect to the vehicle. For example, the relative position may be based on one or more optical aspects of a camera (e.g., the camera's field-of-view (FOV), the camera's field of depth, and the like) that was employed to capture the visual image.

In various embodiments the method identifies that the label associated with the object is indicated in both the first and the second semantic representations of the object. In response to determining that the label is indicated by both the first and second semantic representations, a spatial correspondence between the absolute position of the object and the relative position of the object may be generated. In some embodiments, a relative rotational correspondence between the absolute position of the object and the relative position of the object is also generated. An absolute position of the vehicle, with respect to the surface, may be determined based on the spatial correspondence between the absolute position of the object and the relative position of the object. An orientation of the vehicle may be determined based on the relative rotational correspondence between the absolute position of the object and the relative position of the object. That is, the vehicle may be localized via one or more correspondences between the first and the second semantic representations of the object.

As discussed above, in some embodiments, the visual representation of the object may be included in a captured terrestrial-view visual image of the environment. An aerial-view visual image of the surface may be generated based on an inverse perspective mapping of the terrestrial-view visual image, as discussed throughout. An aerial-view semantic image of the surface, which includes the second semantic representation of the image, may be generated based on a semantic segmentation of the aerial-view visual image. In various embodiments, a coarse localization of the vehicle is determined. A request for a 2D aerial-view semantic map of the surface is transmitted. In response to the transmission of the request, the 2D aerial-view semantic map of the surface is received, where the semantic map includes the first semantic representation of the object. A 2D drive-time aerial-view semantic image of the surface is generated that includes the second semantic representation of the object. An image registration of the 2D aerial-view semantic map and the 2D aerial-view semantic image is generated. The spatial correspondence between the absolute position of the object and the relative position of the object is determined based on the generated image registration.

In some embodiments, the method includes, in response to identifying that the label associated with the object is indicated in each of the first and second semantic representations of the object, generating a rotational correspondence between the first semantic representation of the object and the second semantic representation of the object. A rotational orientation of the vehicle may be determined based on the rotational correspondence between the first semantic representation of the object and the second semantic representation of the object. The rotational orientation of the vehicle is with respect to the surface. The rotational orientation of the vehicle may be indicated by a bearing.

In at least one embodiment, a semantic map that includes the first semantic representation of the object is accessed. A drive-time semantic image that includes the second semantic representation of the object is generated. The drive-time semantic image may also include another semantic representation of another object that is currently included in the environment. The other semantic representation of the other objects indicates another semantic label associated with the other object. The other object may be identified as a dynamic object (e.g., another vehicle, a pedestrian, bicyclist, animal, or the like). In response to identifying the other object as a dynamic object, the drive-time semantic image is updated by removing (i.e., vetoing) the other semantic representation of the other object from the drive-time semantic image. The semantic map and the updated drive-time semantic image are registered to generate the spatial correspondence between the absolute position of the object and the relative position of the object.

In another embodiment, a method of localizing a vehicle on a surface of an environment includes receiving a 2D semantic map of the surface, generating a visual image of the environment, and generating, from the visual image of the environment, a 2D semantic image of the surface. The method may further include generating an image registration of the 2D semantic map and the 2D semantic image. A location of the vehicle may be determined based on the registration of the 2D semantic map and the 2D semantic image, as well as a coordinate system associated with the 2D map.

In some embodiments, the 2D semantic map may be a 2D aerial-view semantic map that includes bird's-eye perspective of the surface. The visual image may be a 2D terrestrial-view visual image that includes a street-level perspective of the environment. The method may include generating a 2D terrestrial-view semantic image by semantically segmenting the 2D terrestrial-view visual image. The 2D terrestrial-view semantic image may include the street-level perspective of the environment. The method may also include generating a 2D aerial-view semantic image by transforming the street-level perspective of the 2D terrestrial-view semantic image such that the 2D aerial-view semantic image includes the bird's-eye perspective of the surface. The method also includes generating the registration by spatially aligning the 2D aerial-view semantic map and the 2D aerial-view semantic image.

In another embodiment, the 2D semantic map is a 2D aerial-view semantic map that includes a bird's-eye perspective of the surface. The visual image is a 2D terrestrial-view visual image that includes a street-level perspective of the environment. The method includes generating a 2D aerial-view visual image by transforming the street-level perspective of the 2D terrestrial-view visual image such that the 2D aerial-view visual image includes the bird's-eye perspective of the surface. The method also includes generating a 2D aerial-view semantic image by semantically segmenting the 2D aerial-view visual image. The 2D aerial-view semantic image may include the bird's-eye perspective of the surface. The registration may be generated by rotationally aligning the 2D aerial-view semantic map and the 2D aerial-view semantic image.

A convolutional neural network (CNN) may be employed to semantically segment the visual image of the environment, as well as to generate the 2D semantic image of the surface. A separate a neural network may be employed to transform a perspective of the visual image of the environment and generate the 2D semantic image of the surface. The 2D semantic map of the surface may be generated based on semantically segmenting a plurality of aerial-view images of the surface. In another embodiment, the 2D semantic map of the surface is generated based on inverse mapping a perspective of a plurality of terrestrial-view images of the environment.

In still another embodiment, a localization method includes accessing a map that includes an aerial perspective of the surface and a first plurality of features. The first plurality of features corresponds to a plurality of tangible objects on the surface. For example, the first plurality of features of the map may be semantic features. The method accessing a first image that includes a street-level perspective of the environment and a second plurality of features. The second plurality of features. The second plurality of features correspond to the plurality of tangible objects on the surface. For example, the second plurality of features of the first image may be semantic features or visual features. That is, in some embodiments, the first image may be a terrestrial-view image in the semantic-domain, while in other embodiments, the first image is a terrestrial-view image in the visual-domain. The first image may be a real-time and/or a drive-time image captured by the vehicle or generated from a visual image captured by the vehicle. A second image may be generated based on a transformation of the second plurality of features of the first image, such that the second image includes the aerial perspective of the surface and a third plurality of features. The third plurality of features correspond to the plurality of tangible objects on the surface. The third plurality of features of the second image may be semantic features. That is, the second image may be an aerial-view semantic image. A correlation between the first plurality of features of the map and the third plurality of features of the second image is determined. The method may generate an alignment of the map and the second image. The alignment is based on the correlation between the first plurality of features and the third plurality of features. The alignment may be generated in the semantic-domain. A localization of the vehicle is determined. The localization is based on the alignment of the map and the second image, as well as a coordinate system associated with the map.

In some embodiments a camera included in the vehicle is employed to capture the first image. The transformation of the second plurality of features of the first image may include an inverse perspective mapping of the street-level perspective of the first image. A neural network may be employed to perform the inverse perspective mapping of the street-level perspective of the first image. In at least one embodiment, the transformation of the second plurality of features of the first image includes a semantic segmentation of the first image to generate the third plurality of features of the second image. A neural network, such as but not limited to a convolutional neural network (CNN), may be employed to perform the semantic segmentation of the first image to generate the third plurality of features of the second image. In various embodiments, the map is generated based on semantically segmenting a plurality of aerial-view images of the surface. In other embodiments, the map is generated based on transforming a perspective of a plurality of terrestrial-view images.

Illustrative Computing Device

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. Memory 1112 may be non-transitory memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for localizing a vehicle on a surface of an environment that includes an object, the method comprising:
   receiving a first semantic representation of the object that indicates a label associated with the object and an absolute position of the object that is with respect to the surface;
   capturing one or more terrestrial-view visual images of the environment including a visual representation of the object that indicates on one or more detected aspects of a plurality of photons received from the object;
   generating an aerial-view visual image of the surface based on an inverse perspective mapping of the one or more terrestrial-view visual images;
   generating an aerial-view semantic image of the surface based on a semantic segmentation of the aerial-view visual image of the surface, wherein the aerial-view semantic image includes a second semantic representation of the object that indicates the label associated with the object and a relative position of the object that is with respect to the vehicle;

in response to identifying that the label associated with the object is indicated in each of the first and second semantic representations of the object, generating a spatial correspondence between the absolute position of the object and the relative position of the object; and determining an absolute position of the vehicle based on the spatial correspondence between the absolute position of the object and the relative position of the object, wherein the absolute position of the vehicle is with respect to the surface.

2. The method of claim 1, wherein the first semantic representation of the object is included in a two-dimensional (2D) aerial-view map of the surface.

3. The method of claim 1, wherein the captured one or more terrestrial-view images of the environment include one or more drive-time terrestrial-view visual images captured by a visual imaging system embedded within the vehicle.

4. The method of 1, further comprising:

in response to a request based on a coarse localization of the vehicle, receiving a two-dimensional (2D) aerial-view semantic map of the surface that includes first semantic representation of the object;

generating the aerial-view semantic image of the surface, wherein the aerial-view semantic image of the surface is a 2D drive-time aerial-view semantic image of the surface; and generating an image registration of the 2D aerial-view semantic map and the 2D aerial-view semantic image; and determining the spatial correspondence between the absolute position of the object and the relative position of the object based on the generated image registration.

5. The method of claim 1, further comprising:

in response to identifying that the label associated with the object is indicated in each of the first and second semantic representations of the object, generating a rotational correspondence between the first semantic representation of the object and the second semantic representation of the object; and determining a rotational orientation of the vehicle based on the rotational correspondence between the first semantic representation of the object and the second semantic representation of the object, wherein the rotational orientation of the vehicle is with respect to the surface.

6. The method of claim 1, further comprising:

accessing a semantic map that includes the first semantic representation of the object;

generating the aerial-view semantic image of the surface, wherein the aerial-view semantic image is a drive-time aerial-view semantic image that includes another semantic representation of another object that is currently included in the environment, and wherein the other semantic representation of the other object indicates another label associated with the other object;

identifying the other object as a dynamic object based on the other label associated with the other object;

in response to identifying the other object as a dynamic object, updating the drive-time aerial-view semantic image by removing the other semantic representation of the other object from the drive-time semantic image; and registering the semantic map and the updated drive-time aerial-view semantic image to generate a spatial correspondence between the absolute position of the object and the relative position of the object.

7. One or more non-transitory computer storage media storing computer-useable instructions that, when executed by one or more computing devices, causes the one or more computing devices to perform actions for localizing a vehicle on a surface of an environment, the actions comprising:

receiving a two-dimensional (2D) semantic map of the surface including a 2D aerial-view semantic map that includes a bird's-eye perspective of the surface;

generating a visual image of the environment including a street-level perspective of the environment;

generating a 2D terrestrial-view semantic image by semantically segmenting the 2D terrestrial-view visual image, wherein the 2D terrestrial-view semantic image includes the street-level perspective of the environment;

generating a 2D semantic image of the surface by transforming the street-level perspective of the 2D terrestrial-view semantic image such that the 2D semantic image of the surface includes a 2D aerial-view semantic image that includes the bird's-eye perspective of the surface;

generating a registration of the 2D semantic map and the 2D semantic image by spatially aligning the 2D aerial-view semantic map and the 2D aerial-view semantic image; and determining a location of the vehicle on the surface based on the registration of the 2D semantic map and the 2D semantic image and a coordinate system associated with the 2D semantic map.

8. The computer storage media of claim 7, wherein a convolutional neural network (CNN) is employed to semantically segment the visual image of the environment and generate the 2D semantic image of the surface.

9. The computer storage media of claim 7, wherein a neural network is employed to transform a perspective of the visual image of the environment and generate the 2D semantic image of the surface.

10. The computer storage media of claim 7, wherein the 2D semantic map of the surface is generated based on semantically segmenting a plurality of aerial-view images of the surface.

11. The computer storage media of claim 7, wherein the 2D semantic map of the surface is generated based on inverse mapping a perspective of a plurality of terrestrial-view images of the environment.

12. A localization system comprising:

one or more processors; and one or more non-transitory computer-readable storage media, coupled with the one or more processors, having instructions stored thereon, which, when executed by the one or more processors, cause the system to localize a vehicle on a surface of an environment by performing actions comprising:

accessing a map that includes an aerial perspective of the surface and a first plurality of features that corresponds to a plurality of tangible objects on the surface;

accessing a first image that includes a street-level perspective of the environment and a second plurality of features that corresponds to the plurality of tangible objects on the surface;

generating a second image based on a transformation of the second plurality of features of the first image, such that the second image includes the aerial perspective of the surface and a third plurality of features that corresponds to the plurality of tangible objects on the surface;

determining a correlation between the first plurality of features of the map and the third plurality of features of the second image;

generating an alignment of the map and the second image based on the correlation between the first plurality of features and the third plurality of features; and determining a localization of the vehicle based on the alignment of the map and the second image and a coordinate system associated with the map.

13. The system of claim 12, wherein the transformation of the second plurality of features of the first image includes an inverse perspective mapping of the street-level perspective of the first image and the system further comprises:

a perspective mapper; and a camera, wherein the actions further comprise:

employing camera to capture the first image; and employing the perspective mapper to perform the inverse perspective mapping of the street-level perspective of the first image.

14. The system of claim 12, wherein the first plurality of features of the map are semantic features corresponding the plurality of tangible objects, the second plurality of features of the first image are visual features corresponding to the plurality of tangible objects, and the third plurality of features of the second image are the semantic features corresponding to the plurality of tangible objects.

15. The system of claim 12, wherein the transformation of the second plurality of features of the first image includes a semantic segmentation of the first image to generate the third plurality of features of the second image and the system further comprises:

a neural network, wherein the actions further comprise:

employing the neural network to perform the semantic segmentation of the first image to generate the third plurality of features of the second image.

16. The system of claim 12, wherein the map is generated based on semantically segmenting a plurality of aerial-view images of the surface.

17. The system of claim 12, wherein the transformation of the second plurality of features of the first image includes an inverse perspective mapping that includes a three-dimensional (3D) reconstruction and image projections employing at least one of stereographic images or 3D images.

18. A method for localizing a vehicle on a surface of an environment that includes an object, the method comprising:

accessing a semantic map including a first semantic representation of the object that indicates a label associated with the object and an absolute position of the object that is with respect to the surface;

capturing a visual representation of the object that indicates on one or more detected aspects of a plurality of photons received from the object;

generating a drive-time semantic image that includes a second semantic representation of the object and another semantic representation of another object that is currently included in the environment, based on a segmentation of the visual representation of the object, that indicates the label associated with the object and a relative position of the object that is with respect to the vehicle, wherein the other semantic representation of the other object indicates another label associated with the other object;

identifying the other object as a dynamic object based on the other label associated with the other object;

in response to identifying the other object as a dynamic object, updating the drive-time semantic image by removing the other semantic representation of the other object from the drive-time semantic image; and in response to identifying that the label associated with the object is indicated in each of the first and second semantic representations of the object, registering the semantic map and the updated drive-time semantic image to generate a spatial correspondence between the absolute position of the object and the relative position of the object; and determining an absolute position of the vehicle based on the spatial correspondence between the absolute position of the object and the relative position of the object, wherein the absolute position of the vehicle is with respect to the surface.

19. One or more non-transitory computer storage media storing computer-useable instructions that, when executed by one or more computing devices, causes the one or more computing devices to perform actions for localizing a vehicle on a surface of an environment, the actions comprising:

receiving a two-dimensional (2D) semantic map of the surface including a 2D aerial-view semantic map that includes a bird's-eye perspective of the surface;

generating a visual image of the environment including a 2D terrestrial-view visual image that includes a street-level perspective of the environment;

generating a 2D aerial-view visual image by transforming the street-level perspective of the 2D terrestrial-view visual image such that the 2D aerial-view visual image includes the bird's-eye perspective of the surface;

generating a 2D semantic image of the surface that includes a 2D aerial-view semantic image by semantically segmenting the 2D aerial-view visual image, wherein the 2D aerial-view semantic image includes the bird's-eye perspective of the surface;

generating a registration of the 2D semantic map and the 2D semantic image by rotationally aligning the 2D aerial-view semantic map and the 2D aerial-view semantic image; and determining a location of the vehicle on the surface based on the registration of the 2D semantic map and the 2D semantic image and a coordinate system associated with the 2D semantic map.

* * * * *